US012511587B2

(12) United States Patent
Jackson

(10) Patent No.: US 12,511,587 B2
(45) Date of Patent: Dec. 30, 2025

(54) ARTIST LIVE PERFORMANCE BOOKING MANAGEMENT PLATFORM SYSTEM AND METHODS

(71) Applicant: TipSee Music LLC, Nashville, TN (US)

(72) Inventor: Dallas Jackson, Nashville, TN (US)

(73) Assignee: TipSee Music LLC, Nashville, TN (US)

( * ) Notice: Subject to any disclaimer, the term of this patent is extended or adjusted under 35 U.S.C. 154(b) by 266 days.

(21) Appl. No.: 18/207,186

(22) Filed: Jun. 8, 2023

(65) Prior Publication Data

US 2023/0316164 A1    Oct. 5, 2023

Related U.S. Application Data

(63) Continuation-in-part of application No. 17/552,724, filed on Dec. 16, 2021, now abandoned.

(51) Int. Cl.
*G06Q 10/02* (2012.01)
*G06Q 30/0207* (2023.01)
*G06Q 30/0601* (2023.01)

(52) U.S. Cl.
CPC ......... *G06Q 10/02* (2013.01); *G06Q 30/0222* (2013.01); *G06Q 30/0621* (2013.01)

(58) Field of Classification Search
CPC .............. G06Q 20/123; G06Q 20/384; G06Q 30/0643; G06Q 30/0635; G06Q 10/02; G06Q 20/405; G06Q 30/06
USPC .......................... 705/5, 14.1, 14.16, 26.1, 59
See application file for complete search history.

(56) References Cited

U.S. PATENT DOCUMENTS

| | | | | |
|---|---|---|---|---|
| 7,526,436 B2* | 4/2009 | Brown | ............... | G06Q 30/0273 705/14.1 |
| 8,306,976 B2* | 11/2012 | Handman | ............... | G06F 16/68 707/751 |
| 9,041,784 B2* | 5/2015 | Rivera | .................. | G11B 27/002 348/61 |
| 9,747,285 B1* | 8/2017 | Laufer | ............... | G06F 16/9537 |
| 10,880,591 B2* | 12/2020 | Rivera | .................... | G07F 17/16 |
| 2003/0187802 A1* | 10/2003 | Booth | .................... | G06Q 10/02 705/59 |
| 2010/0100433 A1* | 4/2010 | Penfield | ............. | G06Q 30/0214 705/26.1 |

(Continued)

*Primary Examiner* — Olusegun Goyea
(74) *Attorney, Agent, or Firm* — H. Brock Kolls

(57) ABSTRACT

The present invention relates to an artist live performance booking management platform and methods of use for increasing an artist's revenue from live performances. In an exemplary embodiment, an artist's revenue can be increased by way of audience members tipping the artist to perform something from a live performance playlist. A second way is by collecting royalties when a performing artist performs one of their original performances. Another way is by identifying prospective venue locations along the artist's travel route that can be added as a live performance venue and date without disrupting the current live performance schedule. Other exemplary embodiments of the present invention include website and e-commerce, promotional offers and campaigns with fans, managing VIP event attendance, and email and other communication tools to build, cultivate, and communicate with a fan base of audience members, consumers, and venue managers.

22 Claims, 23 Drawing Sheets

(56) References Cited

U.S. PATENT DOCUMENTS

| | | | | |
|---|---|---|---|---|
| 2010/0268556 | A1* | 10/2010 | Booth, Jr. | G06Q 10/02 |
| | | | | 705/5 |
| 2012/0265813 | A1* | 10/2012 | Stricklin | G06Q 20/045 |
| | | | | 709/204 |
| 2013/0073324 | A1* | 3/2013 | Liu | G06Q 10/02 |
| | | | | 705/5 |
| 2013/0346226 | A1* | 12/2013 | Nunes | G06Q 30/0605 |
| | | | | 705/26.2 |
| 2014/0344294 | A1* | 11/2014 | Skeen | H04L 65/612 |
| | | | | 707/754 |
| 2015/0302320 | A1* | 10/2015 | Fiorentini | G06Q 10/02 |
| | | | | 705/5 |
| 2016/0063581 | A1* | 3/2016 | Traina | H04N 5/775 |
| | | | | 705/26.1 |
| 2017/0178034 | A1* | 6/2017 | Skeen | H04N 21/252 |
| 2019/0012612 | A1* | 1/2019 | Skeen | G06Q 30/0643 |
| 2019/0385412 | A1* | 12/2019 | Piccionielli | G07F 17/3272 |
| 2020/0320442 | A1* | 10/2020 | Miller | G06Q 20/384 |
| 2021/0287176 | A1* | 9/2021 | Lane | G06F 3/165 |
| 2021/0406850 | A1* | 12/2021 | Herring | G06Q 20/123 |
| 2021/0406995 | A1* | 12/2021 | Peters | G06F 21/10 |
| 2022/0148386 | A1* | 5/2022 | Piccionielli | G10H 1/0058 |

* cited by examiner

ARTIST LIVE PERFORMANCE BOOKING MANAGEMENT PLATFORM SYSTEM AND METHODS

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 17/552,724, inventor Dallas Jackson, entitled "SYSTEMS AND METHODS FOR LIVE MUSIC ARTISTS TO GENERATE REVENUE", filed Dec. 16, 2021.

TECHNICAL FIELD OF THE INVENTION

This invention relates to an artist live performance booking management platform and methods of use for increasing an artist's revenue from live performances. The present invention utilizes remote data processing resources such as servers and other resources to communicate with computing devices such as laptops, tablets, smartphones, and others. In operation, the present invention increases an artist's revenue through live performance tips, royalties, and adding venues along an itinerary route in which to perform live.

Other exemplary embodiments of the present invention include website and e-commerce, promotional offers and campaigns with fans, managing VIP event attendance, and email and other communication tools to build, cultivate, and communicate with a fan base of audience members, consumers, and venue managers.

BACKGROUND OF THE INVENTION

It is known that the digital era and mobile applications have transformed the area of the music and entertainment industry. Now users can instantly listen to live music from their favorite artists/musicians or watch the live performances of their favorite bands by selecting songs or artists from their mobile devices and can easily access music through interactive platforms. However, this digital era has also created a new paradigm shift in measuring an artist's success.

Therefore, new methods or interactive online platforms need to evolve wherein artists or musicians can interact with their fanbase, generate revenues and streamline their shows; online platforms wherein users can easily know the venue of live performances of their favorite songs by their favorite artists/musicians.

Moreover, only the top artists in the music industry are selling out concert tickets while the other amateur artists are finding ways to get noticed. Therefore, technological improvements are required wherein such artists can self-promote by creating their profile which provides opportunities for such musicians to build their own record labels or be discovered via an online platform.

Furthermore, musicians often conduct live performances, and their fans have to travel long distances to attend such live performances at great cost and effort. However, many fans have to listen to music that doesn't fit their taste. To overcome such limitations and disadvantages of conventional and traditional approaches, more technologically improved methods are required wherein fans can request their favorite songs, tip the band, or boost their request.

In accordance with the prior art disclosures, conventional music services have been disclosed. These conventional services use complex algorithms to predict the kind of music that users want to hear. However, such algorithms only take into account the collective history of other users with similar profiles and do not disclose the user's request feature for their favorite song or ways to boot fan-bases or fan engagement of the musicians.

Additionally, various conventional disclosures disclose live music recording files that were distributed via radio or cellular towers to users' mobile phones, transferred through servers, and offered online at a later date. However, this method does not include the engagement of fans with their favorite artist or the generation of revenues for the artist based on the user's request for their favorite songs.

Moreover, in accordance with the conventional disclosure wherein a number of songs and music videos are uploaded to video-on-demand servers such as YOUTUBE are disclosed. The system allows musicians to upload their files to distribute their songs, music, and other performances. However, such conventional disclosure doesn't disclose an efficient method to increase musicians' fan bases and fan engagement or increase music revenue.

Moreover, the prior art disclosures don't disclose notification features wherein users get notified about the venues of live events of their favorite musicians nor it discloses any open request feature or ways to generate revenues. Furthermore, there are various disclosures that provide music streaming applications that allow users to search for specific musical artists or genres of music directly on their mobile devices wherein a user enters an artist's name on their smartphone, and an online music-sharing service streams music from that artist to the user's phone. However, such disclosures don't disclose platforms based entirely on live music or helping artists of all sizes to make money and streamline their shows.

Therefore, there is a need for interactive platforms wherein fans can connect with their favorite musicians/bands/artists to listen to their favorite songs in real-time or watch their favorite bands perform live music. Overall, a platform wherein musicians can create their profile, drive exposure and fan engagement, conduct live performances, generate revenue, and streamline their shows. Further, an easy-to-access online music platform that allows artists to have an open request feature, where fans type in a request from the established library of songs provided by the musician or get notified about their live performance.

Moreover, a system or a method that can efficiently, reliably, and quickly increase musicians' fan bases and fan engagement and consequently increase music revenue. Accordingly, there remains a need in the art for innovative, novel, efficient solutions for live music artists to generate revenue.

The present invention addresses these and other shortcomings by providing an artist live performance booking management platform and methods of use for increasing artist revenue from live performances. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an artist live performance booking management platform method for increasing artist revenue from live performances.

The method comprises the step of creating an artist profile on a server for each artist. The artist profile comprises a live performance playlist and a tip account. One or more computing devices are in data communication with the server.

The method continues by generating the live performance playlist on the server by the artist using one or more computing devices. The live performance playlist comprises one or more performance requests the artist may perform during a live performance at a venue. The live performance playlist is accessible to one or more audience members at least during the live performance using one or more computing devices.

The method continues by adding a performance tip amount to at least one of the performance requests on the live performance playlist by way of the audience member using one or more computing devices and charging the audience member the performance tip amount by way of the server.

The method continues by performing at least a portion of the live performance playlist by the artist at a live performance. And, crediting, by way of the server, at least a portion of the performance tip amount to the tip account of the artist when one of the performance requests on the live performance playlist is performed by the artist during the live performance. In operation, revenue for the artist, from the live performance, is increased by at least a portion of the performance tip amount for executing the performance request at the live performance.

Additional shortcomings of the prior art are overcome and additional advantages are provided through the provision of an artist live performance booking management platform method for increasing artist revenue from live performances. The method comprises the step of creating an artist profile on a server for each artist. The artist profile comprises a live performance playlist. One or more computing device is in data communication with the server.

The method continues by generating the live performance playlist on the server by the artist using one or more of the computing devices. The live performance playlist comprises one or more performance requests the artist may perform during a live performance at a venue. The live performance playlist is accessible to one or more audience members at least during the live performance using one or more computing devices.

The method continues by adding a performance tip amount to at least one of the performance requests on the live performance playlist by way of the audience member using one or more computing devices.

The method continues by performing, by the artist at a live performance, at least a portion of the live performance playlist, and crediting, by way of the server, at least a portion of the performance tip amount to the tip account of the artist when one of the performance requests on the live performance playlist is performed by the artist during the live performances.

The method continues by remitting, on behalf of the venue, a royalty rate to one or more designated recipients for each of the performance requests performed, by the artist, during the live performance. In operation, revenue for the artist, from the live performance, is increased by at least a portion of the performance tip amount for executing the performance request at the live performance.

Additional shortcomings of the prior art are overcome and additional advantages are provided through the provision of an artist live performance booking management platform and method of use for increasing artist revenue from live performances. The method comprises the step of creating a venue profile on a server for each venue. The venue profile comprises at least one venue location. One or more computing devices are in data communication with the server.

The method continues by, creating an artist profile on the server for each artist. The artist profile comprises one or more live performance locations and is associated therewith a live performance date.

Continuing, an itinerary is created for one or more live performance locations and the live performance date on the server by the artist using one or more of the computing devices.

The method continues by, determining, by the server, for the itinerary at least one route the artist can navigate between each of the live performance locations, and determining, by the server, which of the venue by way of the venue location is a prospective added venue for the artist based in part on proximity to the route and absent conflicts with the live performance date currently scheduled.

The method then notifies, by way of the server, with a request to perform live communication that is received on one or more computing devices by the artist or one or more of the prospective added venues. The request to perform live comprises at least the venue location and optionally at least one proposed live performance date.

The method continues by receiving a response to the request to perform live from the artist or one or more of the prospective added venues using one or more of the computing devices.

The method continues by booking, by adding one or more of the requests to perform live to the itinerary on the server by using one or more computing devices. And, confirming with the artist and the prospective added venue acceptance of the request to perform live. In operation, revenue for the artist, from the live performance, is increased from booking an additional live performance along the route between one or more live performance locations.

Additional shortcomings of the prior art are overcome and additional advantages are provided through the provision of an artist live performance booking management platform and method of use for increasing artist revenue from live performances. The method comprises the steps of creating an artist profile on a server for each artist. The artist profile comprises an original performance record, a live performance playlist, and a royalty account. The original performance record comprises one or more original performances and a royalty rate associated with each of the original performances. One or more computing devices are in data communication with the server.

The method continues by, generating the live performance playlist on the server, by a performing artist using one or more computing devices. The live performance playlist comprises at least one original performance that the performing artist will perform at a live performance. At least one artist is the performing artist.

The method continues by, performing by the performing artist at least a portion of the live performance playlist at the live performance.

For each one of the original performances performed by the performing artist in which the original performance is not associated with the performing artist, the method continues by debiting, by the server, the royalty account of the performing artist the royalty rate. And crediting at least a portion of the royalty rate, by the server, to the royalty account of the artist of the original performance that was performed by the performing artist at the live performance. In operation, revenue for the artist from the live performance is increased by at least a portion of the royalty rate when the original performance is performed by the performing artist at the live performance.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
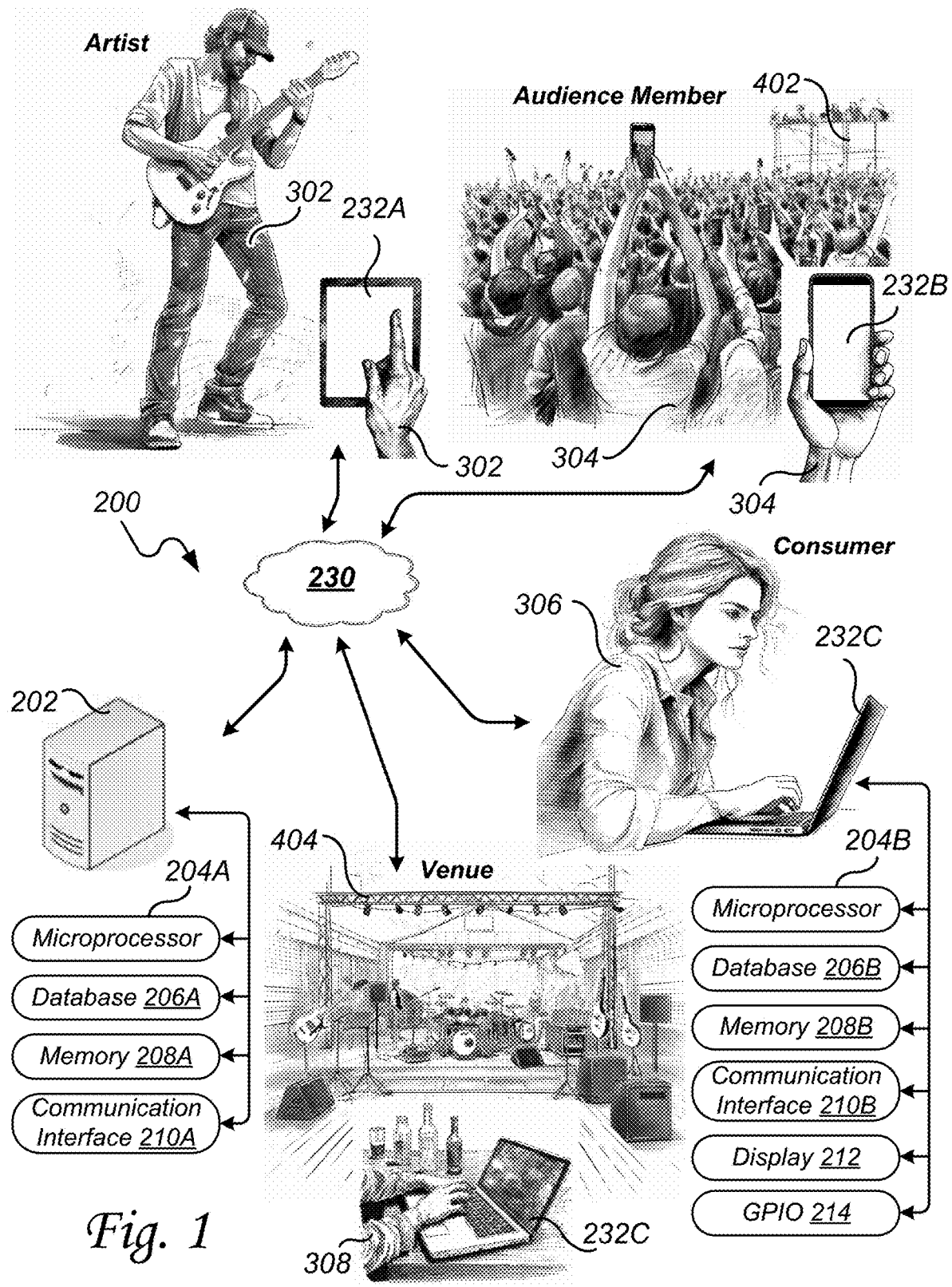
FIG. 1 illustrates one example of an artist live performance booking management platform.

The detailed description explains the preferred embodiments of the invention, together with advantages and features, by way of example with reference to the drawings.

DETAILED DESCRIPTION OF THE INVENTION

When a compelling artist 302, audience members 304/consumers 306 also referred to as fans 304/306, and a venue 404 come together it can make a live performance 402 something special. To make the live performance 402 even better the artist live performance booking platform 200 and methods of use of the present invention can be implemented. In this regard, a fan base 304/306 that comprises consumers 306 and audience members 304 (during a live performance) can engage with the artist 302 before, during, and after the live performance 402.

In an exemplary embodiment, such artist 302 fans 304/306 interactions can include artist 302 efficiently managing a very important person (VIP) access record 532 for a live performance 402.

In an exemplary embodiment, another interaction between artist 302 and fans 304/306 can be the live performance playlist 508 where an audience member 304 can add tips to entries referred to as performance requests 517 on the live performance playlist 508 during a live performance 402 as a financial incentive for artist 302 to perform their favorite live performance playlist 508 performance request 517 (such as a song).

In an exemplary embodiment, another such artist 302 fans 304/306 interaction can be a website that operates in combination with the artist live performance booking platform 200 so that artist 302 can offer/sell promotional merchandise, tickets, VIP passes, and other items to fans 304/306. Such website integration further enables artist 302 to offer promotions only available during live performances 402 and/or at other exclusive time periods.

In an exemplary embodiment, another such artist 302 fans 304/306 interaction can be promotional blog records 528 where the artist 302 and authorized others can post news, articles, audio, videos, pictures, and other digital content so that fans 304/306 and others can follow artist 302 updates and activity. Furthermore, a consumer email record 526 can be used by artist 302 to manage an email mailing, SMS texting list, or other digital communications so that electronic messages can be sent from artist 302 to fans 304/306 and/or venue managers 308.

Additionally, artist 302 and venue 404 can interact to create opportunities for each other in the form of additional bookings. In this regard, artist 302 can create an itinerary 504 of live performances 402. Once created, the artist live performance booking platform 200 can identify and match artist 302 with additional venues 404 and live performance 402 opportunities along the itinerary 504 route increasing the number of bookings for artist 302 and creating live performance 402 opportunities for venues 404.

Additionally, audience member 304, artists 302, and venue managers 308 can provide feedback on artist 302 and/or venue 404. This feedback can be solicited and stored on the artist live performance booking management platform 200 and used by the artist live performance booking management platform 200 to determine one or more of an artist's ratings and/or one more venue's ratings. These ratings can correlate to how well audience members 304 liked artist 302, venue 404, how well the venue manager 308 likes artist 302, how well artist 302 liked venue 404, or other metrics, as may be required and/or desired in a particular embodiment.

In an exemplary embodiment, the artist live performance booking platform 200 of the present invention can remit on behalf of the venue 404 royalty payments to designated recipients such as performance rights organizations (PRO), BMI, ASCAP, or others.

In an exemplary embodiment, the artist live performance booking platform 200 of the present invention can create interactions and revenue opportunities between artists 302. In this regard, an original artist 302 can create an original performance record 516 of their original material so that when a performing artist 302 performs the original material at a live performance 402 a royalty is paid to the original artist 302.

In an exemplary embodiment, to aid venue 404 in selecting artist 302 to perform live, the artist feedback and/or artist rating can be considered. In this regard, venue managers 308 and audience member 304 can provide artist 302 feedback, and the artist live performance booking management platform 200 can generate artist ratings to know a bit more about artist 302 and what to expect from their live performance capabilities.

In a similar manner, in an exemplary embodiment, to aid artist 302 in selecting venue 404 to perform live, the venue feedback and/or venue rating can be considered. In this regard, artist 302 and audience member 304 can provide venue feedback, and the artist live performance booking management platform 200 can generate venue ratings to know a bit more about venue 404 and what to expect from their live performance capabilities.

Turning now to the drawings in greater detail, it will be seen that in FIG. 1 there is illustrated one example of an artist live performance booking management platform 200. In an exemplary embodiment, users of the platform and network can include artist 302, audience members 304 (while at a live performance), consumer 306, venue 404 owners, managers, or other persons of authority can be referred to as venue manager 308 for disclosure purposes. Audience members 304 and consumers 306 can be referred to as fans 304/306 or fan base 304/306 for disclosure purposes. In operation, artist 302 is responsible for creating, managing, and maintaining at least artist profile 502. The venue manager 308 is responsible for creating, managing, and maintaining at least the venue profile 550.

Each of the users uses computing devices 232A-C to data communicate over a global communication network 230 with one or more data processing resources 202. The computing devices 232A-C can be laptop computers, desktop computers, smartphones, tablets, or other types and kinds of computing devices, as may be required and/or desired in a particular embodiment. For disclosure purposes, computing devices 232A-C can be referred to as computing devices 232. Additionally, laptop and desktop types of computing devices 232 can be referred to as computing devices 212C, computing devices 232 such as smartphones can be referred to as computing devices 232B, and computing devices 232 such as tablets can be referred to as computing devices 212A. In operation, any of the users can use any of the types of computing devices 232A-C, without limitation to the type or kind of computing device 232, as may be required and/or desired in a particular embodiment. The global communication network 230 can be the Internet.

The computing devices 232 can comprise a microprocessor 204B, a database 206B, memory 208B, a communication interface 210B, a display 212, and a plurality of general-purpose inputs and outputs (GPIO) 214. Additionally, and as better illustrated in at least FIG. 8, the mobile type of computing device 232 (tablets, smartphones, and others) can comprise a global positioning system (GPS) 216, and a microphone and/or camera 218. In general, computing devices 232 can be configured with other functions and features, as may be required and/or desired in a particular embodiment.

Figure 8:
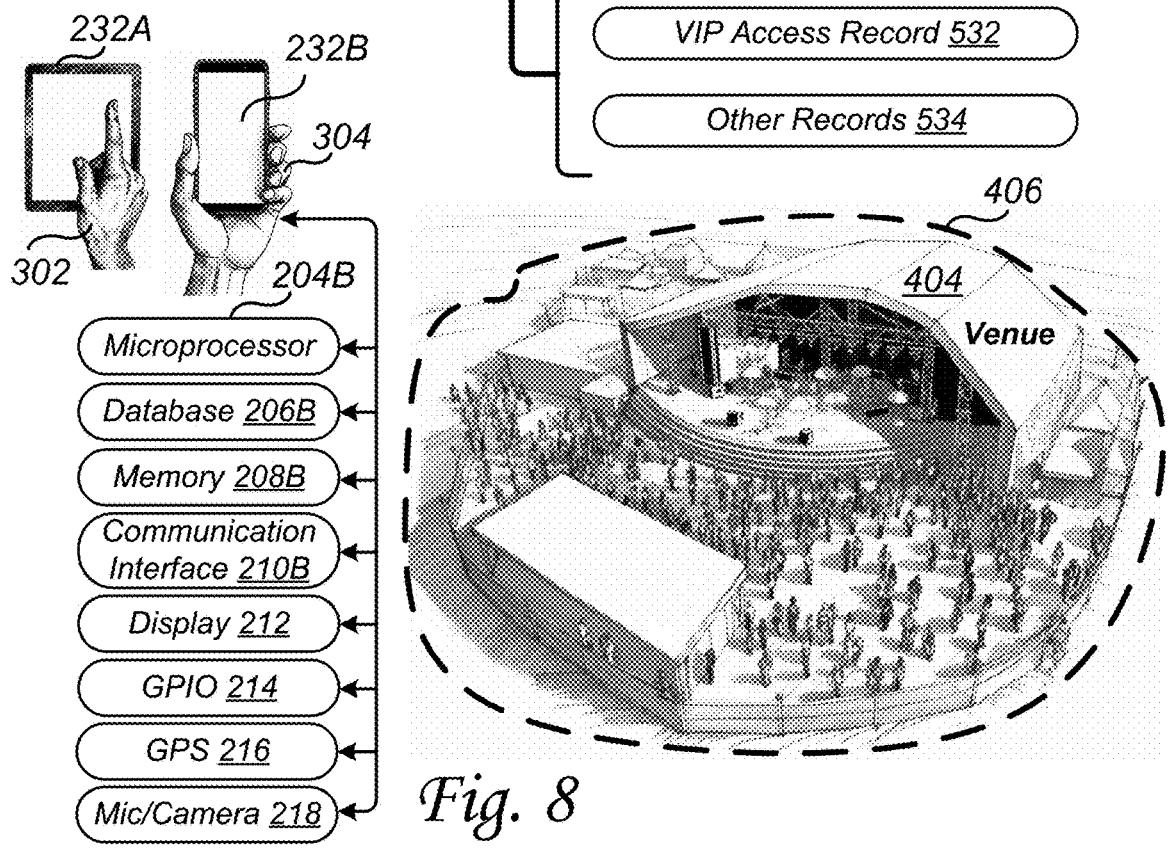
FIG. 8 illustrates one example of providing geofenced boundary areas for use with the methods of the present invention.

With reference to FIG. 8, the microprocessor 204B is operationally related to database 206B, memory 208B, communication interface 210B, display 212, GPIO 214, and if equipped with GPS 216, and microphone and/or camera 218. The computing devices 232 each rely on a suitable power source which can include a rechargeable battery, external power supply, or other types and/or kinds of power sources.

Microcontroller 204B can be INTEL, ZILOG, MICROCHIP, AMD, ARM, and/or other types or kinds of microprocessors.

Database 206B can be SQL, MYSQL, MARIADB, ORACLE, MS ACCESS, network-accessible storage, flat files, a combination thereof, or other types and kinds of databases.

Memory 208B can be a combination of RAM, ROM, flash, hard drives, solid-state drives, USB flash drives, micro-SD cards, or other types of removable memory, and/or other types and kinds of memory.

The communication interfaces 210B can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display 212 can be a liquid crystal display (LCD), light emitting diode (LED), organic light emitting diode (OLED), or other types and kinds of displays.

The general-purpose inputs and outputs (GPIO) 214 can be TTL, CMOS, MOSFET, transistors, buffers, relays, push-buttons, switches, and/or other types and kinds of GPIO circuits. In an exemplary embodiment, some of the GPIO 214 lines can be used to drive a touch screen input, biometric input devices, keyboards, and or types and kinds of computing device input devices.

Global positioning system (GPS) device 216 can be used to determine the geographic location of fans 304/306 who are carrying a computing device 232 equipped with a GPS 216. In this regard, such computing devices 232 are typically mobile computing devices such as tablets 232A, smartphones 232B, and other similar types and/or kinds of mobile computing devices 232.

Microphone and/or camera 218 can be used to record audio, and video, and take pictures. In this regard, fans 304/306 can use their computing devices equipped with a microphone and/or camera 218 to make digital media records that can be selectively shared on social media and other digital media outlet locations.

With reference to FIG. 1, the data processing resource 202 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 202 can also be referred to as server 202.

The data processing resource 202 can comprise a microprocessor 204A, a database 206A, memory 208A, and a communication interface 210A. The microprocessor 204A is operationally related to database 206A, memory 208A, and communication interface 210A.

The microcontroller 204A can be INTEL, ZILOG, MICROCHIP, AMD, ARM, and/or other types or kinds of microprocessors.

The database 206A can be SQL, MYSQL, MARIADB, ORACLE, MS ACCESS, network accessible storage, flat files, a combination thereof, or other types and kinds of databases.

The memory 208A can be a combination of RAM, ROM, flash, hard drives, solid-state drives, USB flash drives, micro-SD cards, or other types of removable memory, and/or other types and kinds of memory.

The communication interfaces 210A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Figure 2:
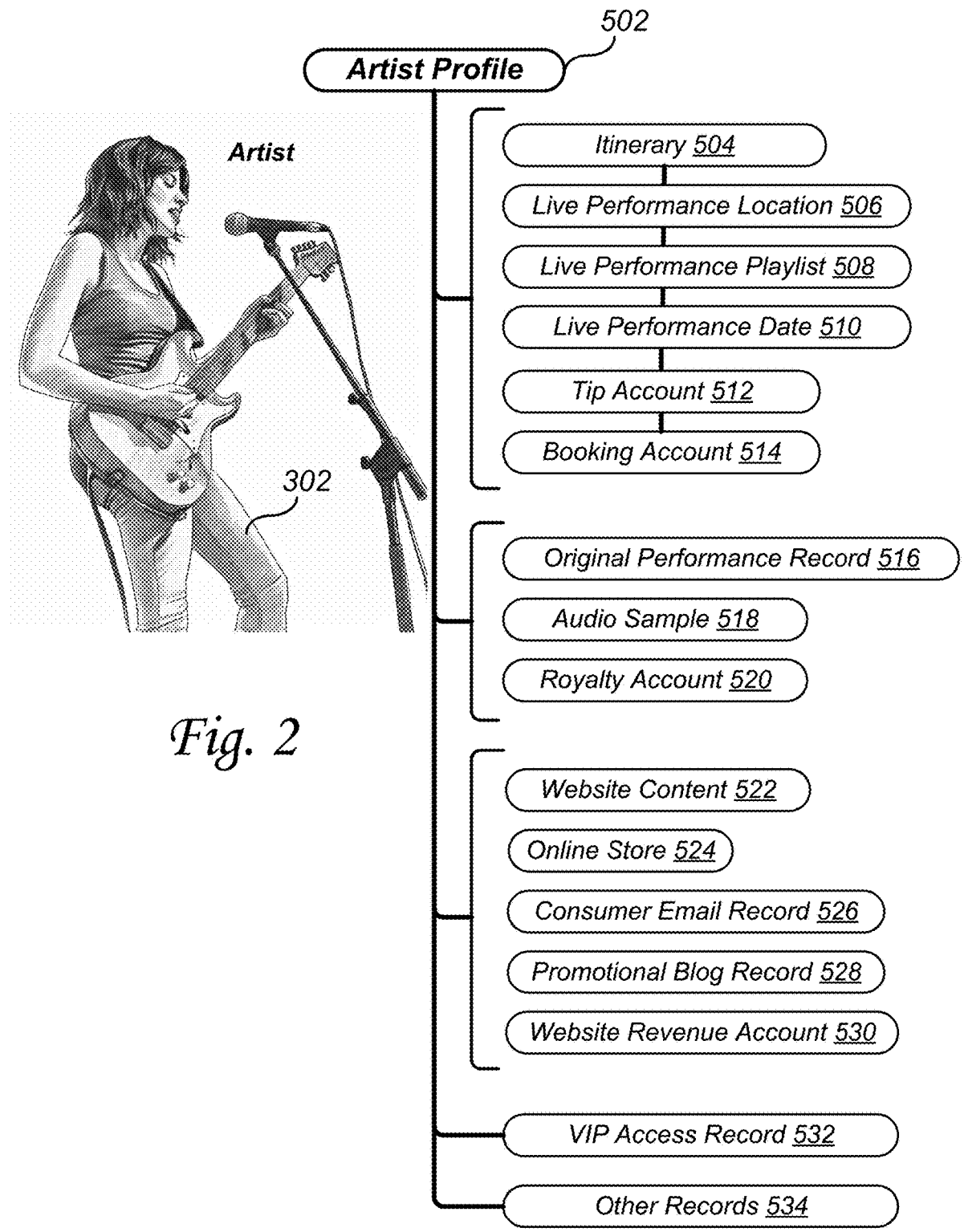
FIG. 2 illustrates one example of an artist profile.

Referring to FIG. 2, there is illustrated one example of an artist profile 502. In an exemplary embodiment, the artist profile 502 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

Artist profile 502 can comprise an itinerary 504 record for managing artist 302 live performance itinerary. Such live performance management can also include the artist profile 502 comprising live performance location 506 records, live performance playlist 508 records, live performance date 510 records, tip account 512, booking account 514, and other database tables, records, fields, and accounts as may be required and/or desired in a particular embodiment.

In an exemplary embodiment, artist profile 502 can also comprise original performance record 516 for tracking an artist's original performance works, audio sample 518 records associated with the original performance works, a royalty account 520, or other database tables, records, fields, and accounts as may be required and/or desired in a particular embodiment.

In an exemplary embodiment, artist profile 502 can also comprise website content 522 records, online store 524 records, consumer email records 526 such as email list to communicate with fans 304/306 and venue managers 308, promotional blog records 528, website revenue account 530, and other database tables, records, fields, and accounts as may be required and/or desired in a particular embodiment.

In an exemplary embodiment, artist profile 502 can also comprise very important (VIP) record 532 for managing a live performance VIP list, other records 534 used for other purposes, and other database tables, records, fields, and accounts as may be required and/or desired in a particular embodiment.

Figure 3:
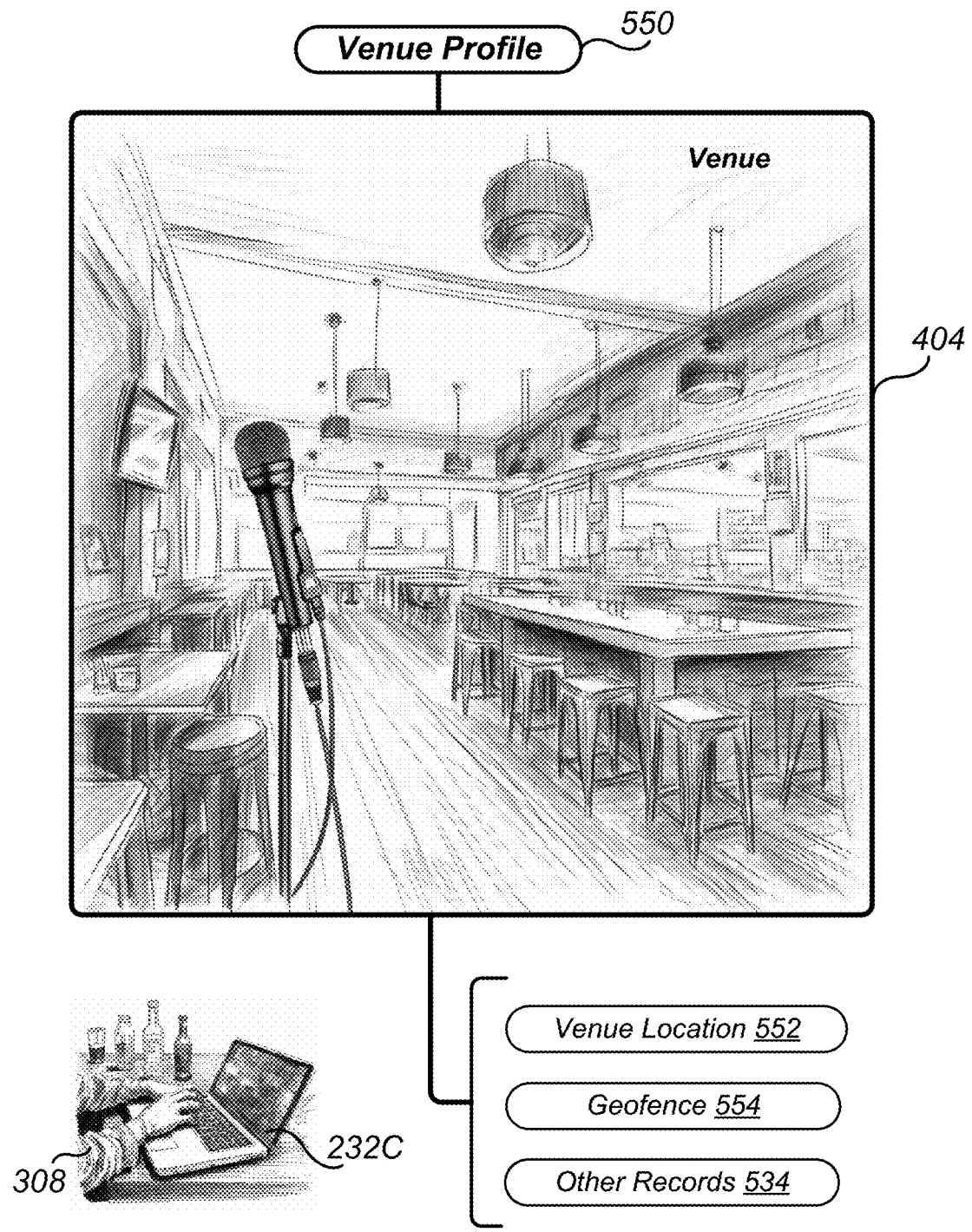
FIG. 3 illustrates one example of a venue profile.

Referring to FIG. 3, there is illustrated one example of a venue profile 550. In an exemplary embodiment, the venue profile 550 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

In an exemplary embodiment, the venue profile for venue 404 can be accessed/created/managed/maintained as appropriate by venue manager 308. The venue profile can comprise venue location 552 records, other records 554, and other database tables, records, fields, and accounts as may be required and/or desired in a particular embodiment.

Figure 4:
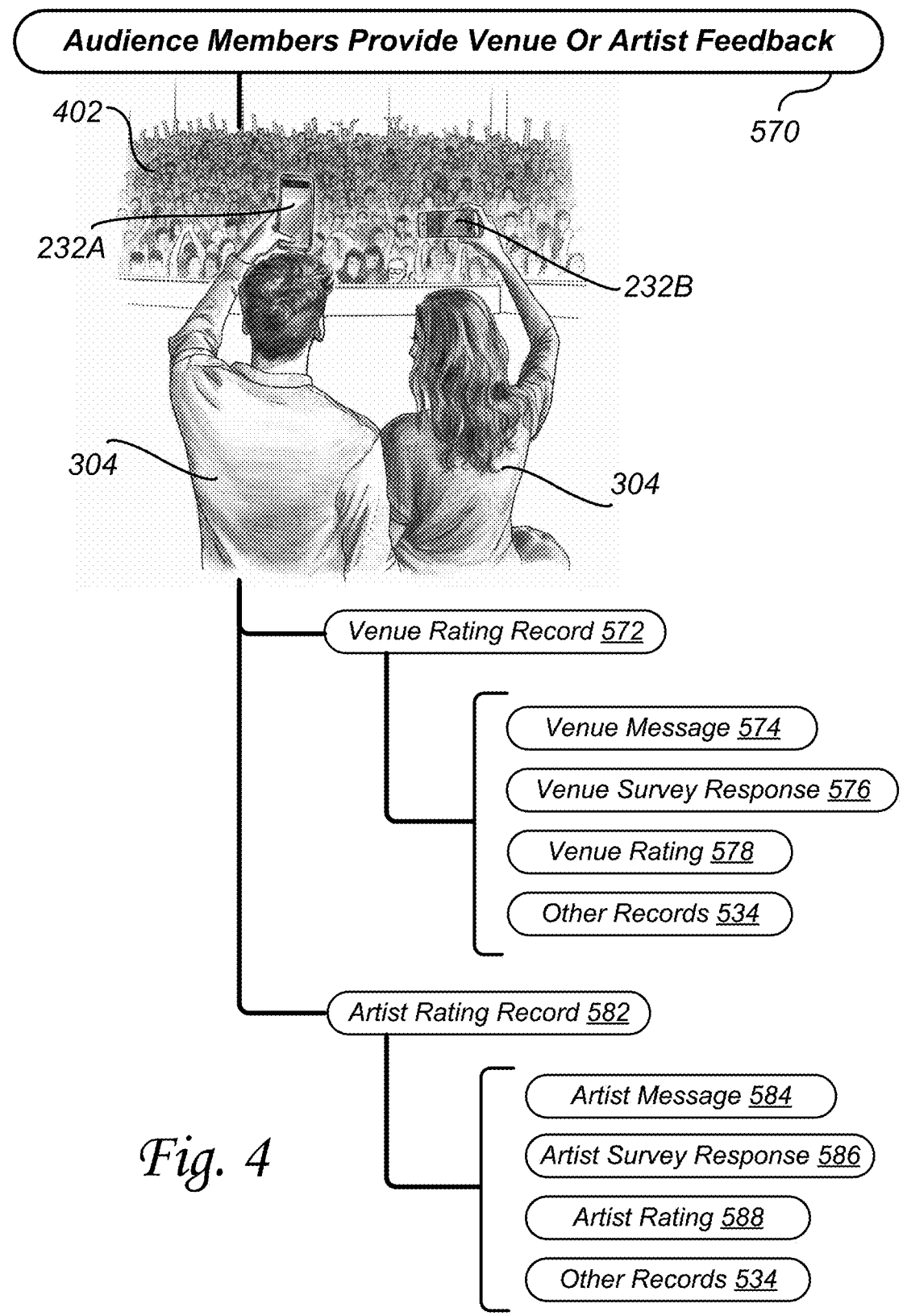
FIG. 4 illustrates one example of audience members providing a venue or artist feedback.

Referring to FIG. 4, there is illustrated one example of audience members providing venue 404 or artist 302 feedback 570. In an exemplary embodiment, audience member 304 can provide venue 404 or artist 302 feedback 570. Such venue 404 or artist 302 feedback can comprise a venue rating record 572 and an artist rating record 582. Venue rating record 572 and artist rating record 582 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

In an exemplary embodiment, the venue rating record 572 can comprise venue message 574 records where posts can be stored, venue survey response 576 records where surveys and survey results can be stored, venue rating 578 records where determined venue ratings can be stored, other records 534, and/or other database tables, records, fields, and accounts as may be required and/or desired in a particular embodiment.

In an exemplary embodiment, the artist rating record 582 can comprise artist message 584 records where posts can be stored, artist survey response 586 records where surveys and survey results can be stored, artist rating 588 records where determined artist ratings can be stored, other records 534, and/or other database tables, records, fields, and accounts as may be required and/or desired in a particular embodiment.

Figure 5:
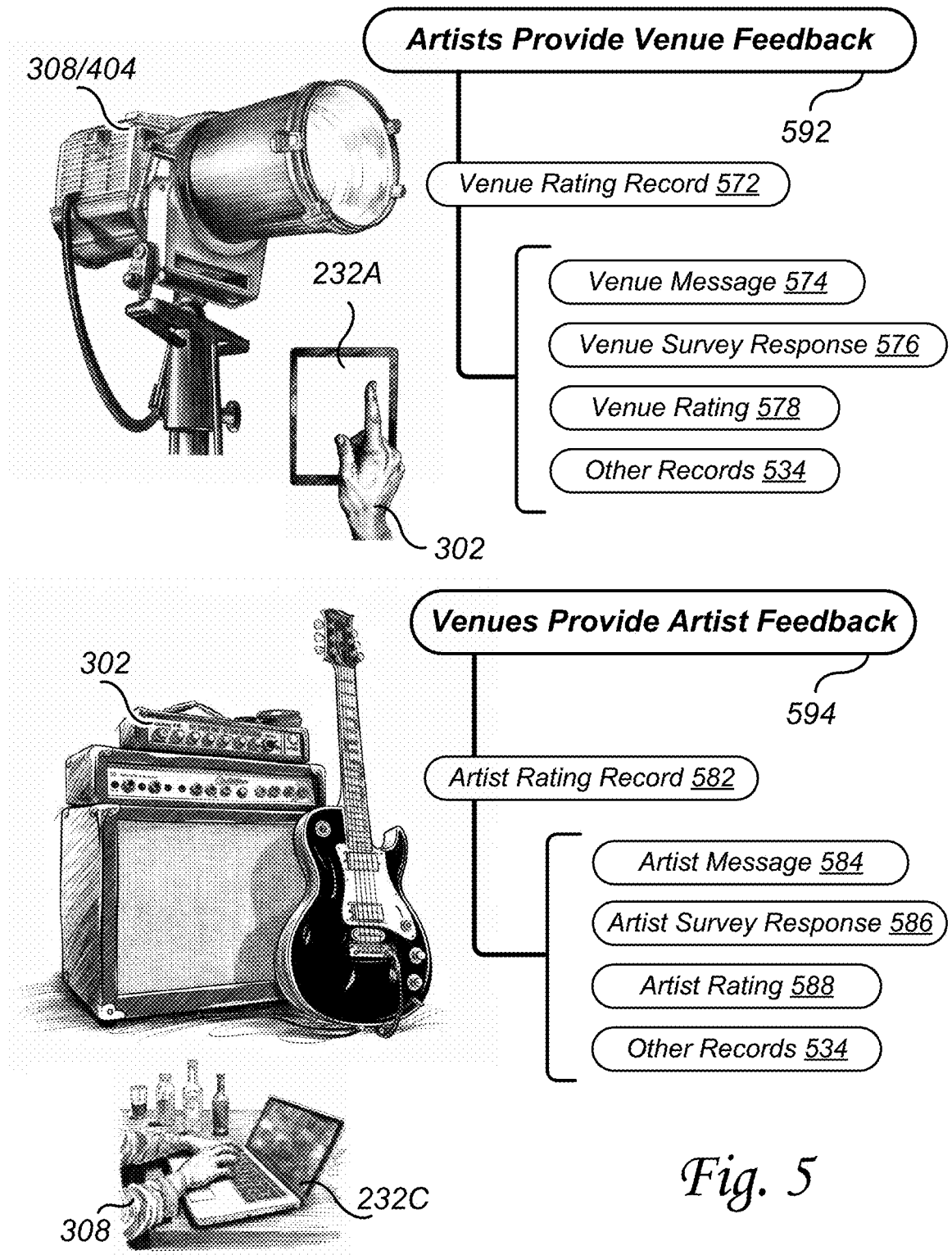
FIG. 5 illustrates one example of artists providing venue feedback or venues providing artist feedback.

Referring to FIG. 5, there is illustrated one example of artists 302 providing venue 404 feedback or venues (authorized person such as the venue managers 308) providing artist 302 feedback. In an exemplary embodiment, artists 302 can provide venue 404 feedback 592, or venues by way of venue managers 308 provide artist 302 feedback 594. In this regard, artists providing venue feedback 592, or venues providing artist feedback 594 can comprise a venue rating record 572 and an artist rating record 582. Venue rating record 572 and an artist rating record 582 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

In an exemplary embodiment, the venue rating record 572 can comprise venue message 574 records where posts can be stored, venue survey response 576 records where surveys and survey results can be stored, venue rating 578 records where determined venue ratings can be stored, other records 534, and/or other database tables, records, fields, and accounts as may be required and/or desired in a particular embodiment.

In an exemplary embodiment, the artist rating record 582 can comprise artist message 584 records where posts can be stored, artist survey response 586 records where surveys and survey results can be stored, artist rating 588 records where determined artist ratings can be stored, other records 534, and/or other database tables, records, fields, and accounts as may be required and/or desired in a particular embodiment.

Figure 6:
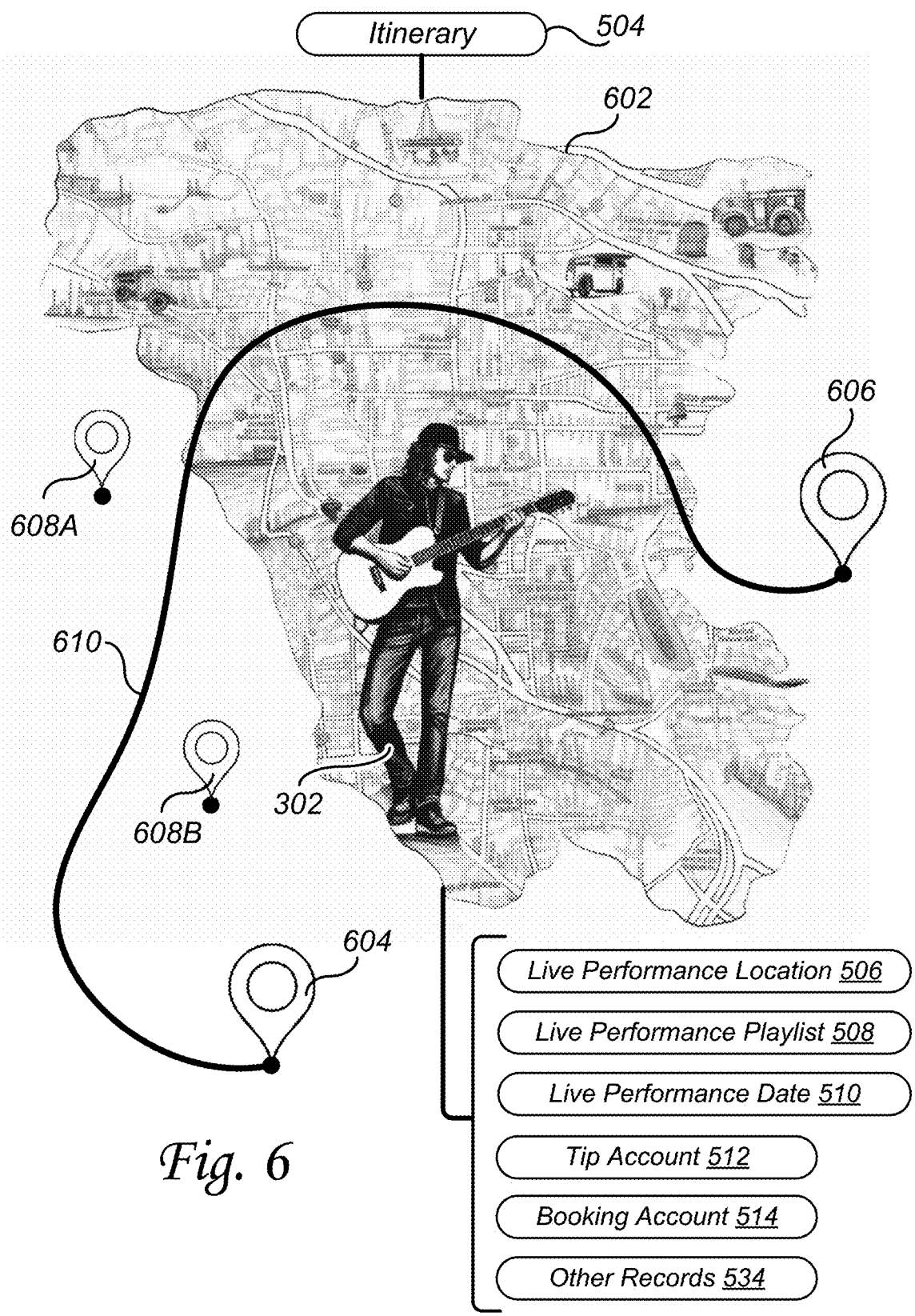
FIG. 6 illustrates one example of identifying prospective added venues along a route between live performance locations.

Referring to FIG. 6, there is illustrated one example of identifying prospective added venues 608A/608B along route 610 within a geographic area 602 between live performance locations 604 and 606. In an exemplary embodiment and with reference to at least FIG. 23, finding additional venues 608A/608B in which to perform a live performance 402 along an itinerary route 610 between already scheduled live performance locations 604/606 and live performance dates 510 is one way to increase artist 302 revenue from live performances 402. Such geographic area 602 can be a geographic region, a city, a community, a group of States, a country, a plurality of countries, or another defined geographic area, as may be required and/or desired in a particular embodiment.

In an exemplary embodiment, the itinerary 504 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

Artist profile 502 can comprise itinerary 504 records for managing artist 302 live performance itinerary. Such live performance management can also include the artist profile 502 comprising live performance location 506 records, live performance playlist 508 records, live performance date 510 records, tip account 512, booking account 514, and/or other database tables, records, fields, and accounts as may be required and/or desired in a particular embodiment.

Figure 7:
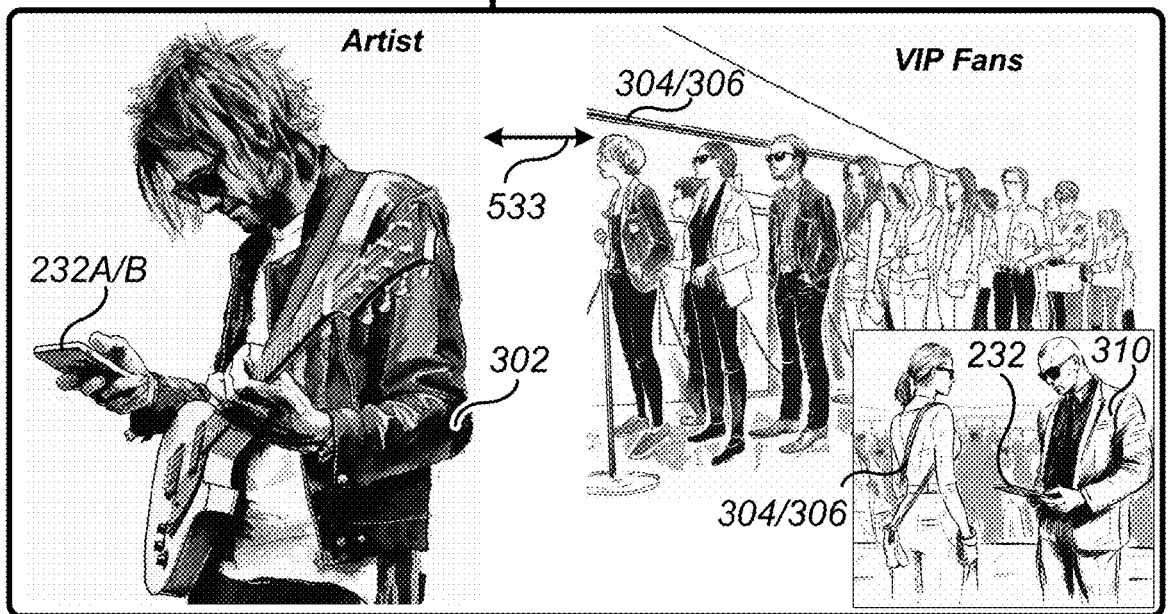
FIG. 7 illustrates one example of providing very important people (VIP) access between the artist and VIP audience members.

Referring to FIG. 7, there is illustrated one example of providing very important people (VIP) access between the artist and VIP audience members. In an exemplary embodiment, the VIP access 531 can be a collection of database tables, records, fields, and accounts that can be managed in a database 206A/206B on remote data processing resources 202 such as a server 202 and/or a computing device 232. In this regard, information can be stored and retrieved from the databases 206A/206B as needed to effectuate the artist live performance booking management platform 200 and methods of the present invention.

In an exemplary embodiment, VIP access 531 can be accessed/created/managed/maintained as appropriate by artist 302. The VIP access 531 can comprise VIP access record 532, other records 534, and/or other database tables, records, fields, and accounts as may be required and/or desired in a particular embodiment.

In an exemplary embodiment, artist 302 can add or subtract fans 304/306 to and from the VIP access record 532. Then at venue 404 event personnel 310 can check the VIP access record 532 to grant VIP privileges to certain fans 304/306 that are listed in the VIP access record 532. Such VIP privileges can include entry to the live performance 402, backstage passes, or other VIP privileges as may be required and/or desired in a particular embodiment.

Referring to FIG. 8, there is illustrated one example of providing geofenced boundary areas for use with the methods of the present invention. In an exemplary embodiment, the computing devices 232 equipped with GPS 216 in the possession of a fan 304/306 can be used to determine if fan 304/306 is inside or outside of a geofenced area 406 at venue 404.

The computing devices 232A/232B such as tablets, smartphones, and other computing devices can comprise a microprocessor 204B, a database 206B, memory 208B, a communication interface 210B, a display 212, and a plurality of general-purpose inputs and outputs (GPIO) 214. Additionally, the mobile type of computing devices (tablets, smartphones, and others) can comprise a global position system (GPS) 216, and a microphone and/or camera 218. In general, computing devices 232 can be configured with other functions and features, as may be required and/or desired in a particular embodiment.

Global position system (GPS) device 216 can be used to determine the geographic location of fans 304/306 who are carrying a computing device 232 equipped with a GPS 216. In this regard, such computing devices 232 are typically mobile computing devices such as tablets 232A, smartphones 232B, and other similar types and/or kinds of mobile computing devices 232.

A microphone and/or camera 218 can be used to record audio, and video, and take pictures. In this regard, fans 304/306 can use their computing devices equipped with a microphone and/or camera 218 to make digital media records that can be selectively shared on social media and other digital media outlet locations.

Figure 19:
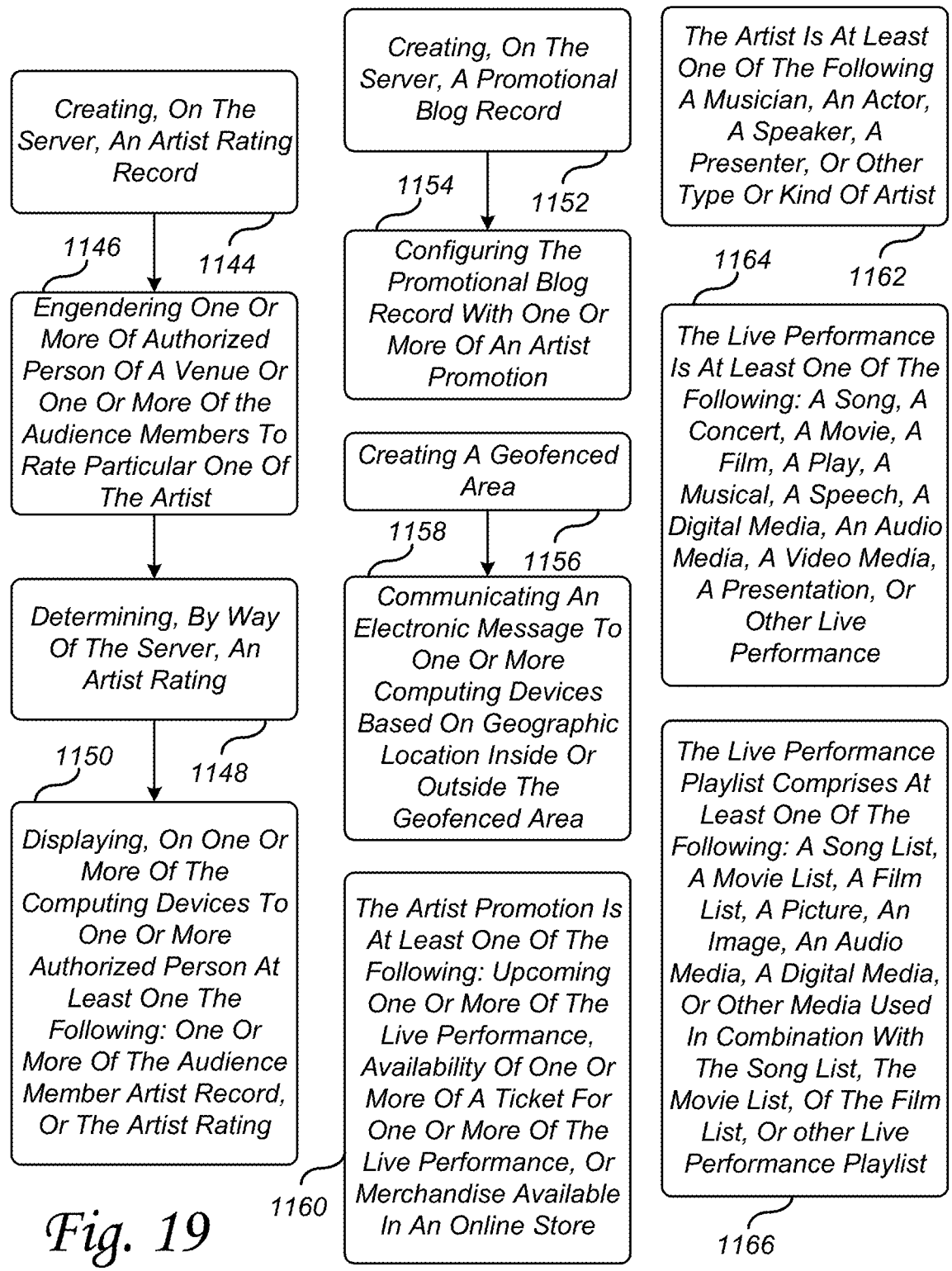

In operation, and as better illustrated in at least FIG. 19 steps 1156 and 1158, a geofenced area 406 can be created and stored on server 202. The geofenced area is located proximate to at least a portion of venue 404 associated with the live performance 402. Geofencing 406 effectuates the ability to determine by way of the GPS 216 that is part of the fans 304/306 computing devices 232 such as smartphones and other types and/or kinds of computing devices 232 whether they are inside the venue 404 geofenced area or outside the venue 404 geofenced area. Once determined, for example, and not a limitation, appropriate electronic messaging including at-venue-only promotions and communications can be electronically sent to fans 304/306 that are inside the geofenced 406 boundary area of the venue 404.

In another exemplary embodiment, such geofenced boundaries 406 and determination that a fan 304/306 is present at the live performance 402 can also be used to restrict tips and other live performance activities with the software application of the present invention to those fans 304/306 that are physically in attendance at the live performance 402 at venue 404.

In operation, an electronic message can be communicated to one or more of the fans 304/306 including the audience member 304 or one or more consumers 306 based on the geographic location of the computing device 232 by way of the GPS 216 or other suitable geolocating method using the computing device 232 that is associated with the audience member 304 or the consumer 306. The electronic message can be different based on whether the computing device is inside or outside the geofenced area 406, only sent to the computing devices 232 that are inside the geofenced area 406, only sent to the computing devices 232 that are outside the geofenced area 406, or other types or kinds of electronic messages, as may be required and/or desired in a particular embodiment.

Figure 9:
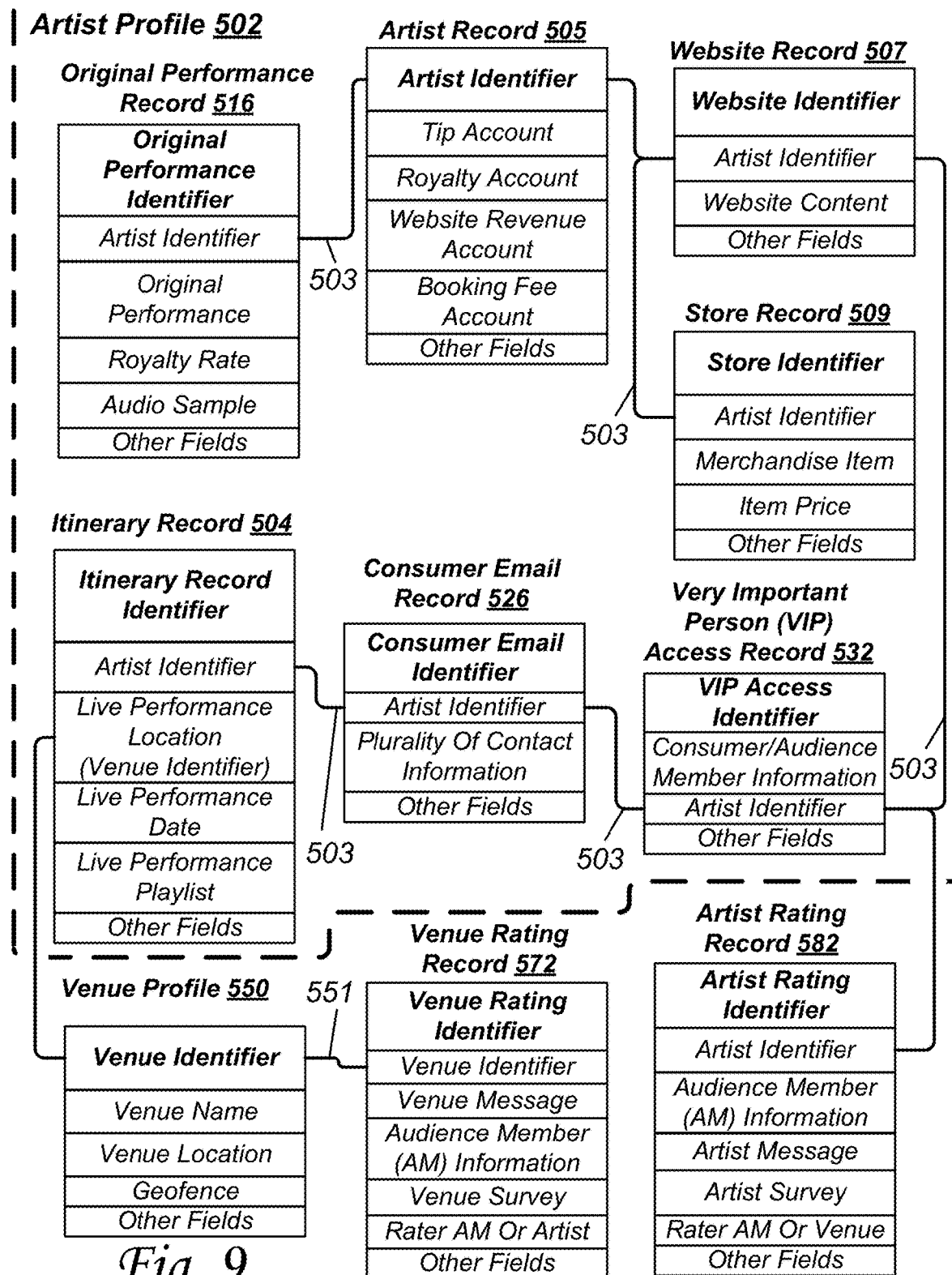
FIG. 9 illustrates one example of a database structure for the artist live performance booking management platform and methods of the present invention.

Referring to FIG. 9, there is illustrated one example of a database structure for the artist live performance booking management platform 200 and methods of the present invention. In an exemplary embodiment, at least one database 206A/206B can be implemented on at least one of the data processing resources 202 or server 202, or computing device 232. In operation, such one or more databases 206A/206B can be accessed/created/managed/maintained as appropriate by more than one stakeholder. In this regard, in addition to system administrators and other authorized persons, other stakeholders that can access/create/manage/maintain as appropriate at least parts of the artist live performance booking management platform 200 databases can include artist 302, fans 304/306, and venue managers 308, event personnel 310, and other authorized persons.

In an exemplary embodiment, such databases 206A/206B can be SQL, MYSQL, MARIADB, ORACLE, MS ACCESS, network-accessible storage, flat files, a combination thereof, or other types and kinds of databases.

In an exemplary embodiment, the artist profile 502 can comprise a series of tables, records, fields, and accounts that include original performance record 516, artist record 505, website record 507, store record 509, itinerary record 504, consumer email record 526, VIP record 532, or other types or kinds of records as may be required and/or desired in a particular embodiment.

The database structure illustrated in FIG. 9 also illustrates the relationship 503 of the artist identifier field between the various tables within the artist profile 502 and the artist rating record 582.

In an exemplary embodiment the data structure of the artist profile 502 is illustrative and can be expanded and modified without particular limitation as needed and as appropriate to support the functionality and methods of the present invention and to support future functionality and methods of the artist live performance management platform 200 as it grows and evolves over time.

In an exemplary embodiment, the venue profile 550 can comprise a series of tables, records, fields, and accounts as appropriate and as needed in a particular embodiment. The database structure illustrated in FIG. 9 also illustrates the relationship 551 of the venue identifier field with the venue rating record 572.

In an exemplary embodiment, the venue rating record 572 can comprise a series of tables, records, fields, and accounts as appropriate and as needed in a particular embodiment.

In an exemplary embodiment, the artist rating record 582 can comprise a series of tables, records, fields, and accounts as appropriate and as needed in a particular embodiment.

Referring to FIGS. 10-14, there are illustrated examples of a software application user interface for some of the artist live performance booking management platform 200 user interactions and methods of the present invention.

Figure 10:
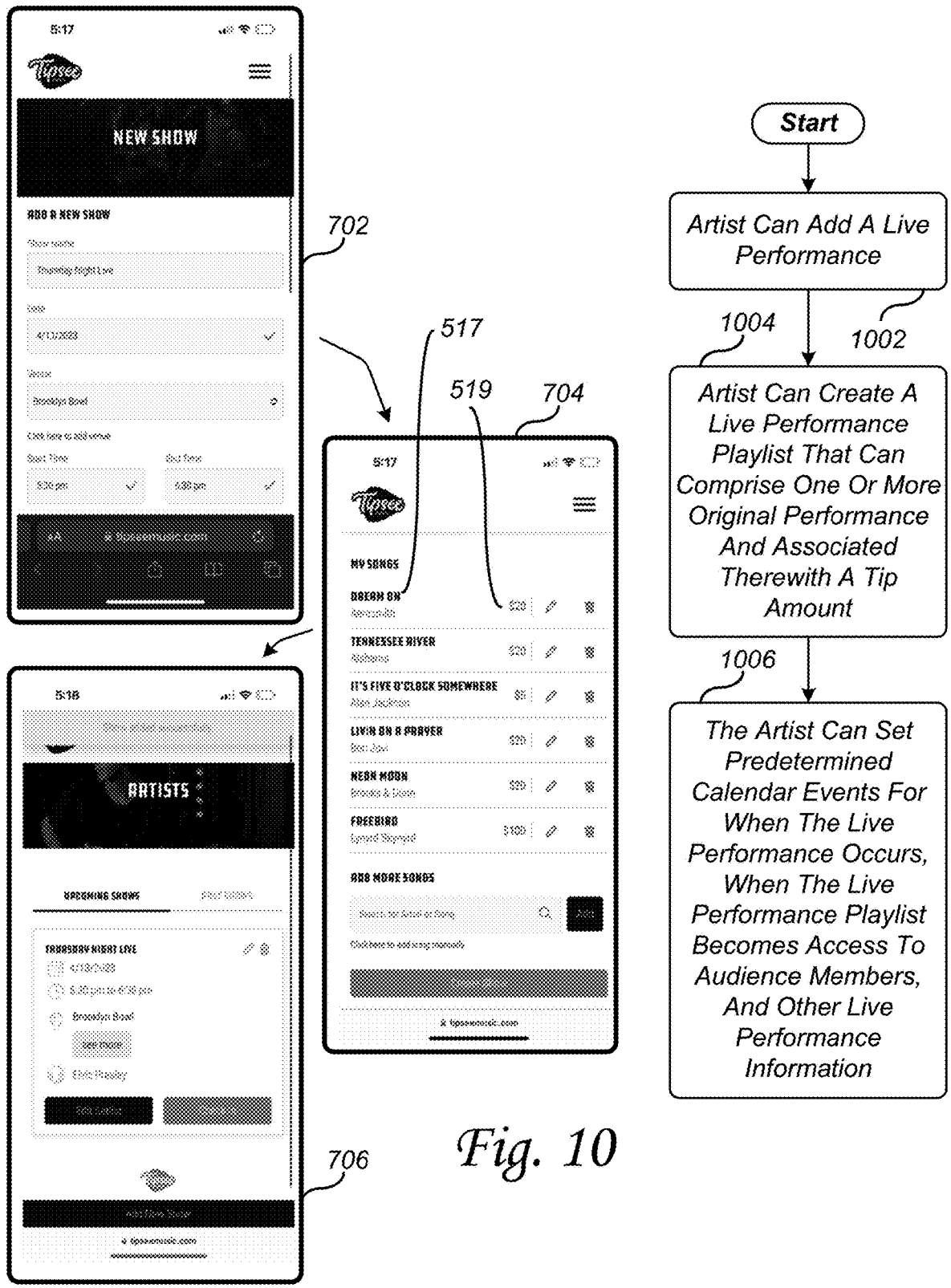
FIGS. 10-14 illustrate examples of a software application user interface for some of the artist live performance booking management platform and methods of the present invention.

In an exemplary embodiment and application use case and with reference to FIG. 10, in screenshot 702 and corresponding step 1002 artist 302 can add a live performance including a live performance location 506 and a live performance date 510.

Then in screenshot 704 and corresponding step 1004, artist 302 can create a live performance playlist 508 and associate with each of the performance requests 517 entries in the live performance playlist 508 a tip amount 519 that artist 302 as well as audience members 304 can incrementally adjust by way of a tip amount 521.

Then in screenshot 706 and corresponding step 1006, artist 302 can set a predetermined calendar event for when the live performance occurs 506/510, other live performance information, and when the live performance playlist 508 including the current total tip amount 519 for each of the performance request 517 entries on the live performance playlist 508 becomes accessible to audience members 304.

Figure 11:
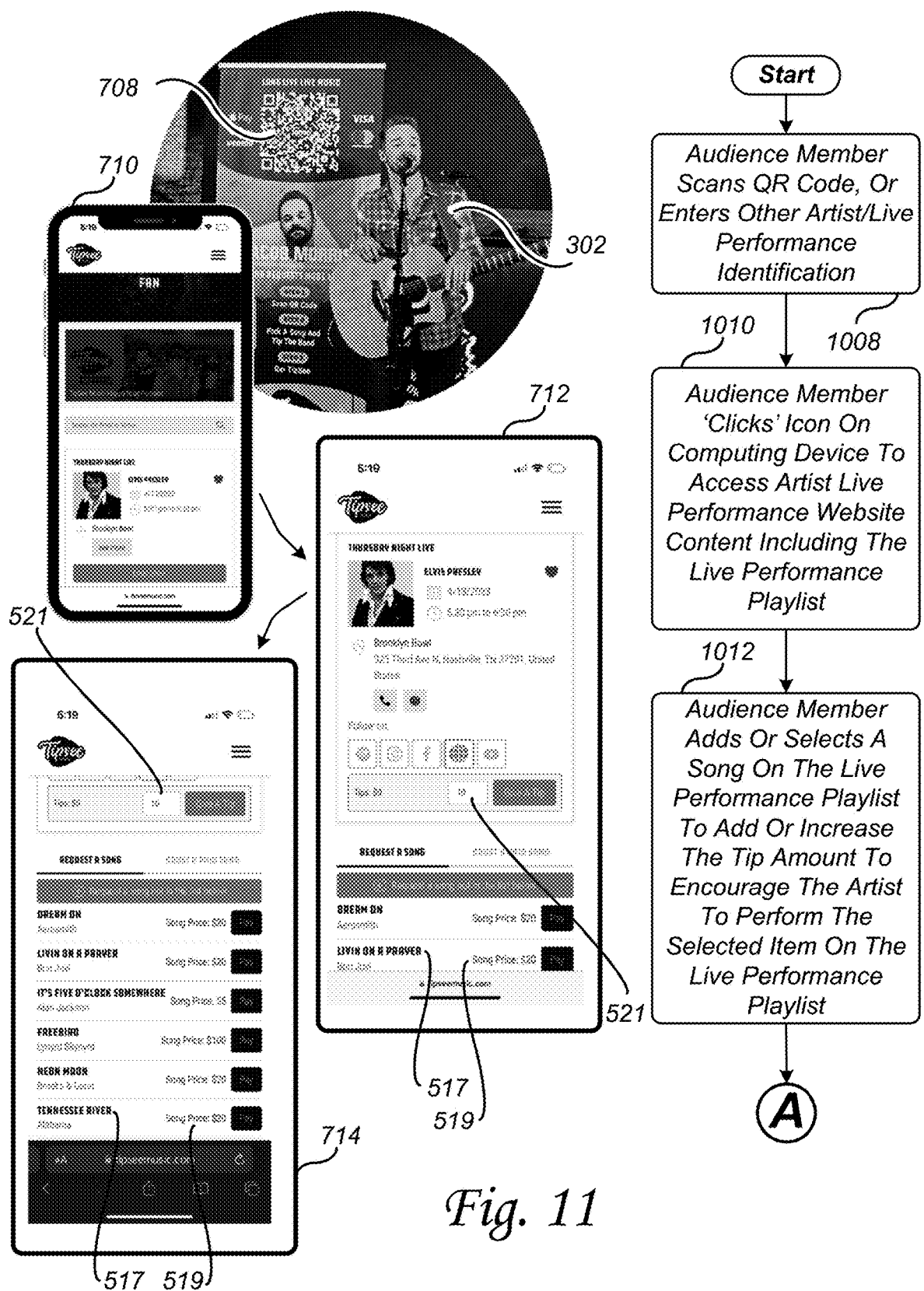
Figure 12:
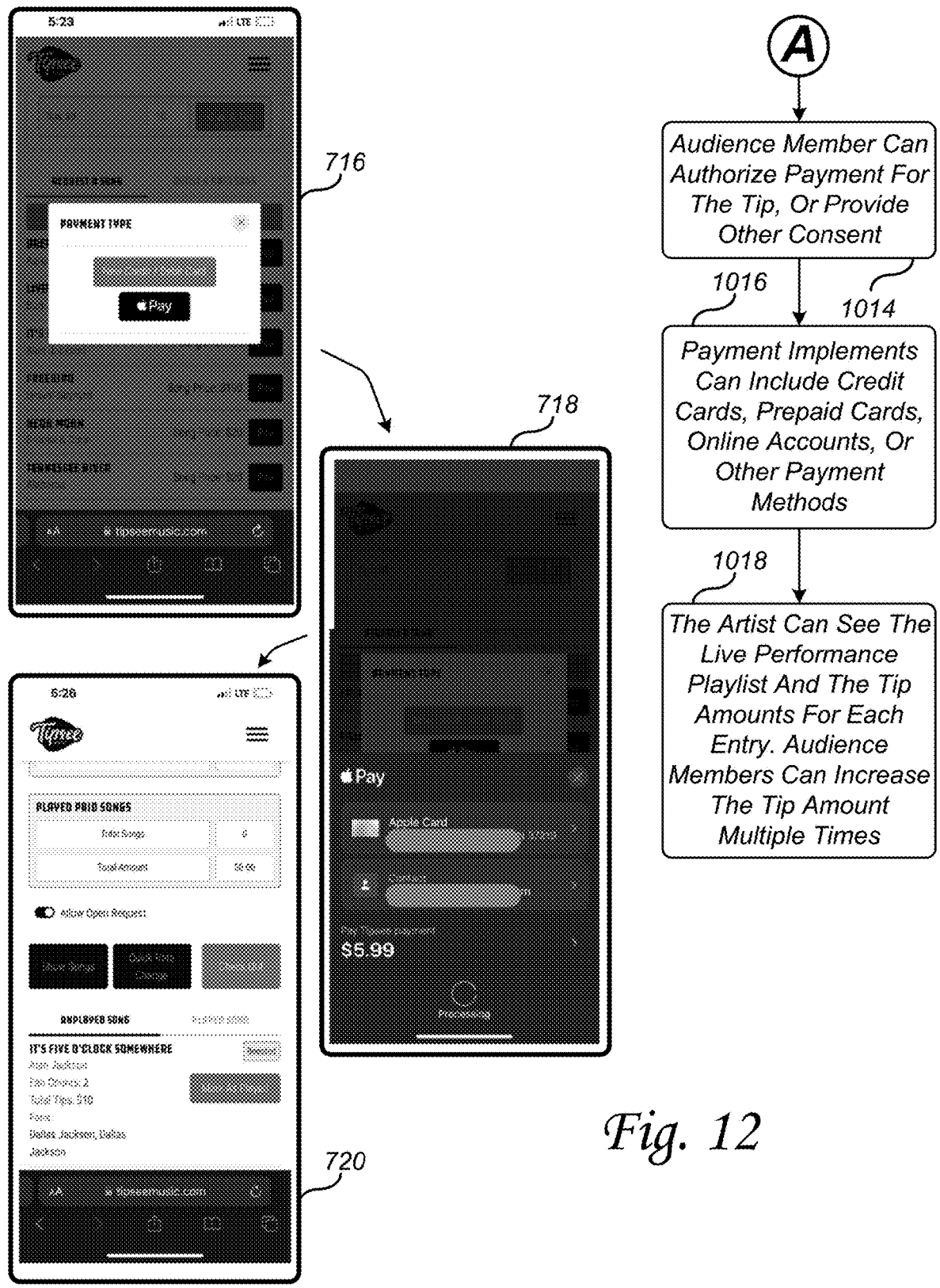

Referring to FIGS. 11 and 12, in an exemplary embodiment, in operation, an audience member 304 can scan a quick response (QR) code 708 or use other methods with their computing device 232. The QR code 708 can be positioned proximate to artist 302 as illustrated, on posters or flyers, and/or positioned in other ways, as may be required and/or desired in a particular embodiment. In screenshot 710 and corresponding step 1008, audience member 304 can scan the QR code 708 or otherwise enter artist 302 or live performance identification information, or other information to be directed to artist 302 live performance website content 522 or other desired landing page or location.

Then in screenshot 712 and corresponding step 1010, audience member 304 can see or navigate to information about artist 302, the live performance 402, other information, and the live performance playlist 508.

Then in screenshot 714 and corresponding step 1012, audience member 304 can see the current tip amounts 519 as well as add a tip amount 521 to one or more of the live performance request 517 entries as an incentive to artist 302 to perform the performance request 517 entry.

Continuing in FIG. 12 screenshot 716 and corresponding step 1014, upon adding a tip amount to one or more of the entries in the live performance playlist 508, audience member 304 can be prompted to pay the tip amount 521 they added, authorize to pay the tip amount they added, increment or decrement a prepaid account they have established to pay for the tip amount added, electronically transfer fund from VENMO, PAYPAL, APPLE PAY, or other similar services to pay for the tip amount added, or otherwise provide funds or consent to access funds as may be required and/or desired in a particular embodiment.

Then in screenshot 718 and corresponding step 1016, the audience member is prompted to authorize a payment implement for use to pay the added tip amount. Such payment implements can include credit cards, prepaid cards, gift cards, vouchers, online accounts like VENMO, PAYPAY, APPLEPAY, or other payment implements and/or accounts as may be required and/or desired in a particular embodiment.

Then, as illustrated in screenshot 720 and corresponding step 1018, in real-time artist 302 can see the live performance playlist, dashboard, and/or other summary information regarding the live performance playlist, tips, or other information.

Figure 13:
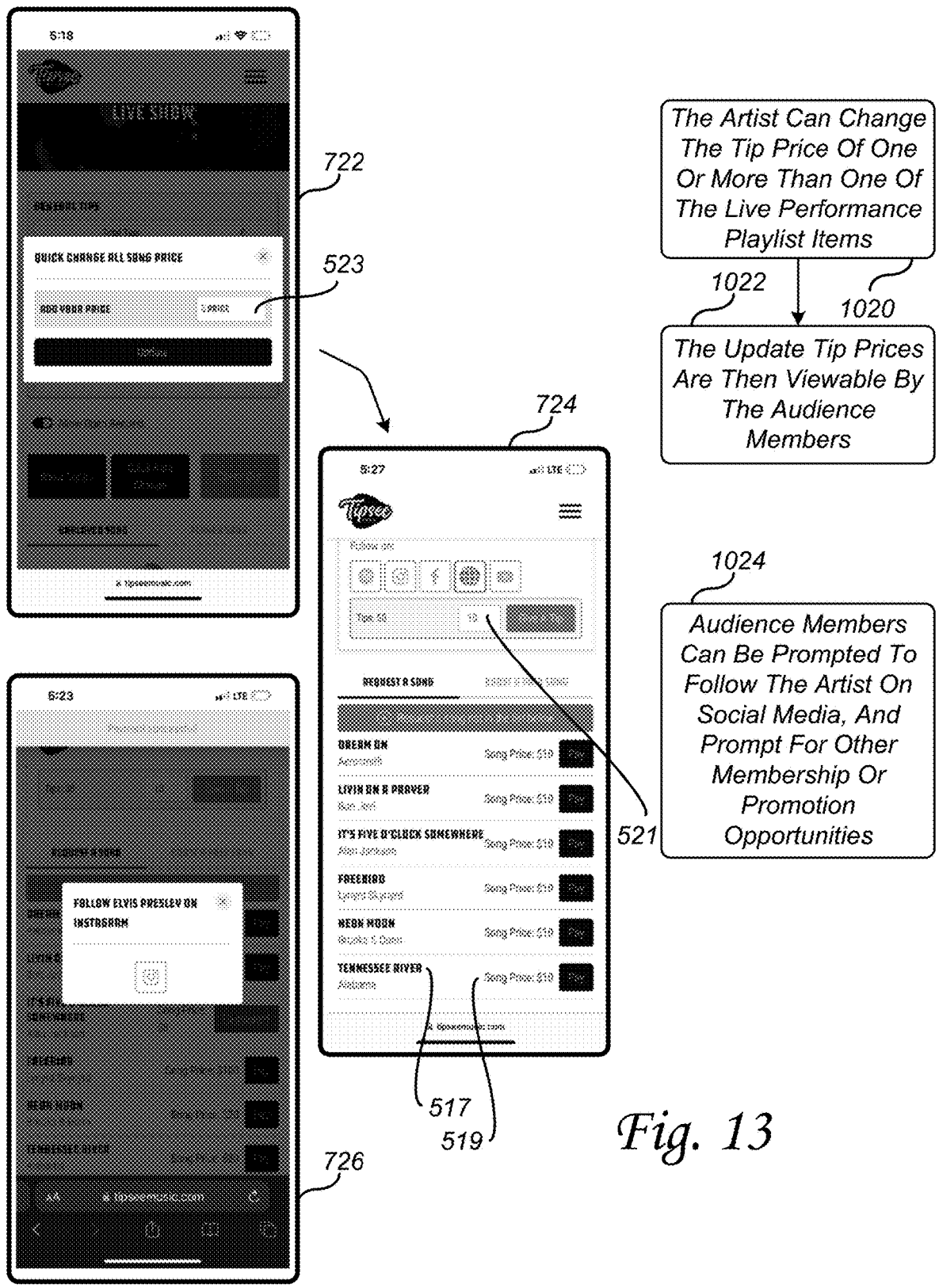

Referring to FIG. 13, in an exemplary embodiment, in operation, in screenshot 722 and corresponding step 1020, artist 302 can elect to quickly change 523 a tip amount 519 on all of the performance requests 517 entries on the live performance playlist 508. As an example, perhaps changing 523 the tip amount 519 for each of the performance requests 517 entries in the live performance playlist 508 from five dollars to ten dollars.

Then, as illustrated in screenshot 724 and corresponding step 1022 the new tip amount 519, in this example ten dollars, is viewable for each of the performance request 517 entries in the live performance playlist 508.

With reference to screenshot 726 and corresponding step 1024, during the live performance, the audience member 304 can be prompted to follow or other engage with artist 302 on social media networks such as INSTAGRAM, FACEBOOK, or others.

Figure 14:
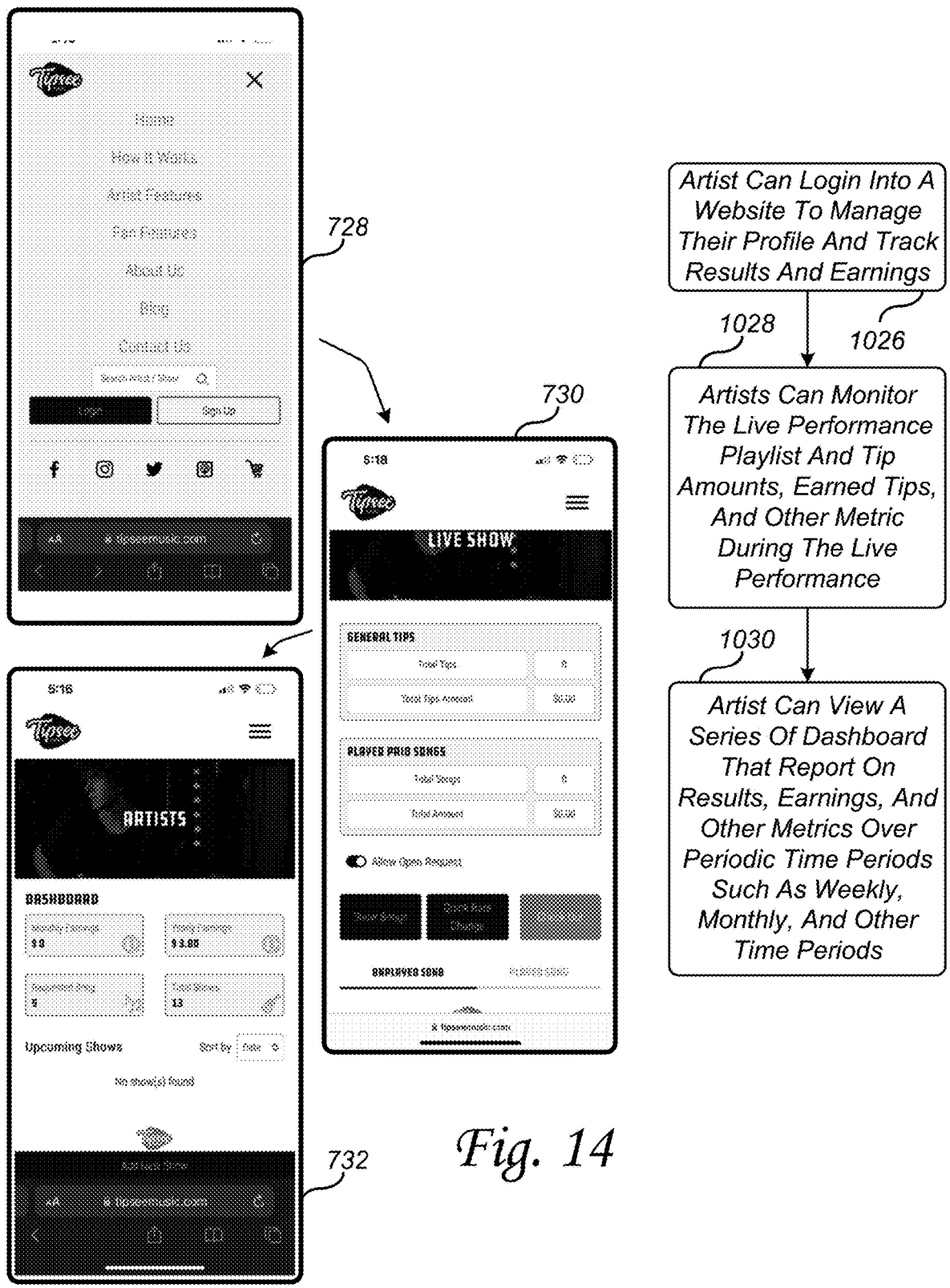

Referring to FIG. 14, in an exemplary embodiment, in operation, in screenshot 728 and corresponding step 1026, artist 302 can log in to the TIPSEE application/website page to manage their artist profile 502.

Then in screenshot 730 and corresponding step 1028, artist 302 can monitor before, during, and after live performances various dashboards to see statistics, accounts, and other information. In this regard, in screenshot 732 and corresponding step 1030 artist 302 can view dashboards that report on results, earnings, and other metrics or time periods such as daily, weekly monthly, and other time periods.

Figure 15:
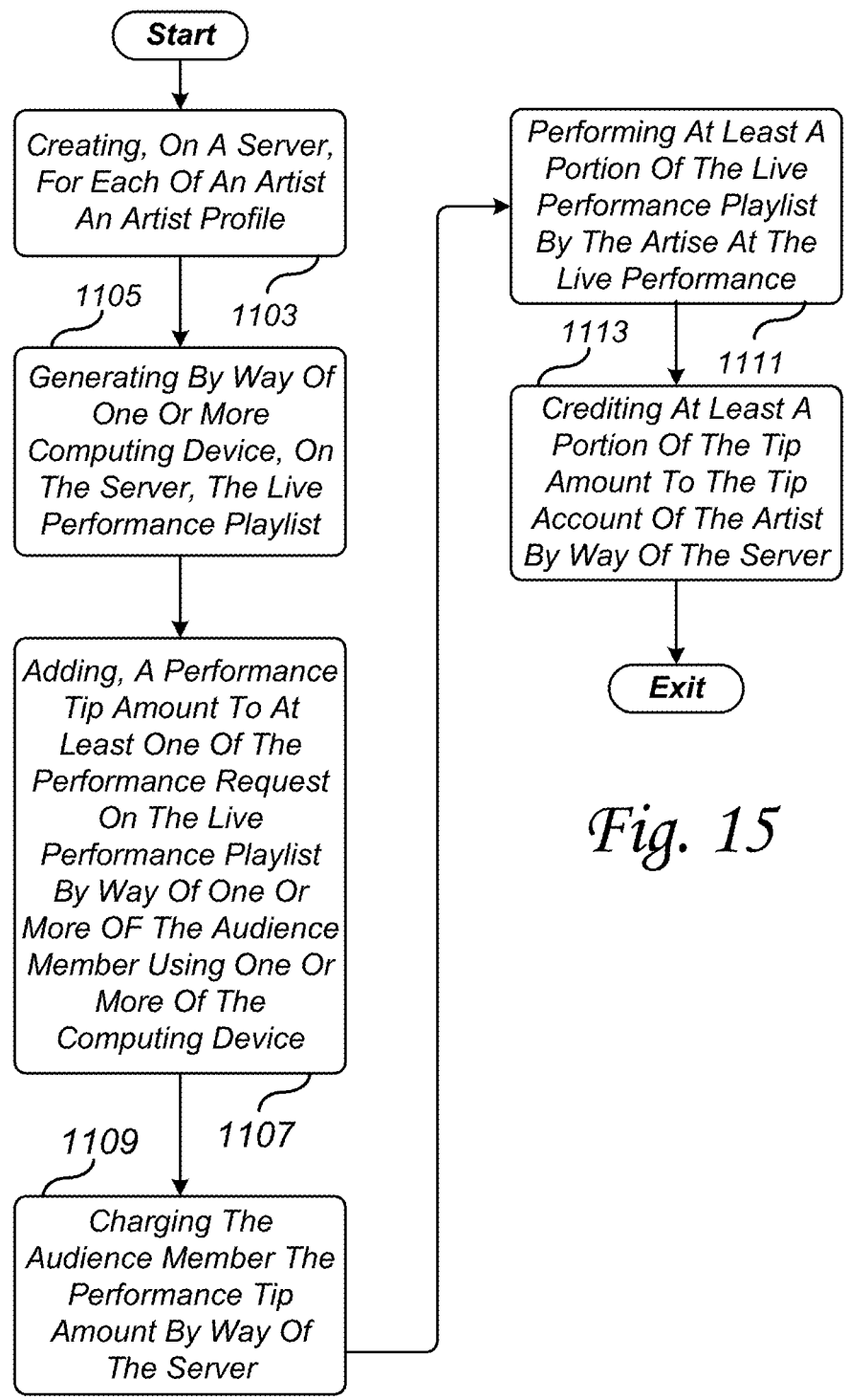
FIGS. 15-16 illustrate examples of an artist live performance booking management platform methods for increasing artist revenue from live performances.

Referring to FIG. 15, there is illustrated one example of an artist live performance booking management platform 200 methods for increasing artist revenue from live performances. In an exemplary embodiment, artist 302 can create and manage a live performance playlist 508 that includes a tip amount 519 for at least some of the performance request 517 entries on the live performance playlist 508. In this regard, audience member 304 can add or increase a tip amount 519 for one or more of the performance requests 517 entries on the live performance playlist 508 as an incentive for artist 302 to perform their favorite playlist performance request 517 entry. As a result of the tips, artist 302 revenue from the live performance can be increased. The method begins in step 1103.

In step 1103, an artist profile 502 is created on server 202 for each artist 302. Artist profile 502 comprises a live performance playlist 508 and a tip account 512. One or more computing devices 232 is in data communication with server 202. The method then moves to step 1105.

In step 1105, the live performance playlist 508 is generated on server 202 by artist 302 using one or more computing devices 232. The live performance playlist 508 comprises one or more performance requests 517 the artist 302 may perform during a live performance 402 at a venue 404. The live performance playlist 508 is accessible to one or more audience members 304 at least during the live performance 402 using one or more computing devices 232. The method then moves to step 1107.

In step 1107 a performance tip amount 521 is added to at least one of the performance requests 517 on the live performance playlist 508 by way of one or more of the audience members 304 using one or more of the computing devices 232. The method then moves to step 1109.

In step 1109 audience member 404 is charged the performance tip amount 521 by way of server 202. The method then moves to step 1111.

In step 1111, at least a portion of the live performance playlist 508 is performed by artist 302 at a live performance 404. The method then moves to step 1113.

In step 1113, at least a portion of the performance tip amount 521 is credited to the tip account 512 of artist 302 by way of server 202 when one of the performance requests 517 on the live performance playlist 508 is performed by artist 302 during the live performance 402.

In operation, revenue for artist 302 from the live performance, is increased by at least a portion of the performance tip amount 521 for executing the performance requests 517 at the live performance 402.

In an alternative exemplary embodiment, artist 302 can elect to keep all the tip amount funds 521 in effect keeping all of the total tip amounts 519 for each of the performance requests 517 on the live performance playlist 508 whether artist 302 performed the performance request 517 or not.

In another alternative exemplary embodiment, artist 302 can elect to give back or cancel the tip amount funds 521 in effect nullifying or otherwise canceling the total tip amount 519 for each of the performance requests 517 on the live performance playlist 508 that artist 302 didn't perform.

In an exemplary embodiment, the manner in which an audience member can be charged for a tip amount 521 can include preauthorizing a maximum amount and then accruing a total amount until the end of the live performance 402. Then charging the total amount one time, charging or decrement on a tip amount by tip amount basis each time a tip amount 521 is made, or other methods as may be required and/or desired in a particular embodiment.

In an exemplary embodiment, a portion of the tips can be retained by the artist live performance booking management platform 200, or retained by other accounts or systems as a service fee for transacting the debit and credit of the tips. Such service fees can be a fixed fee, a percentage, a combination thereof, or other types of kinds of fees.

Figure 16:
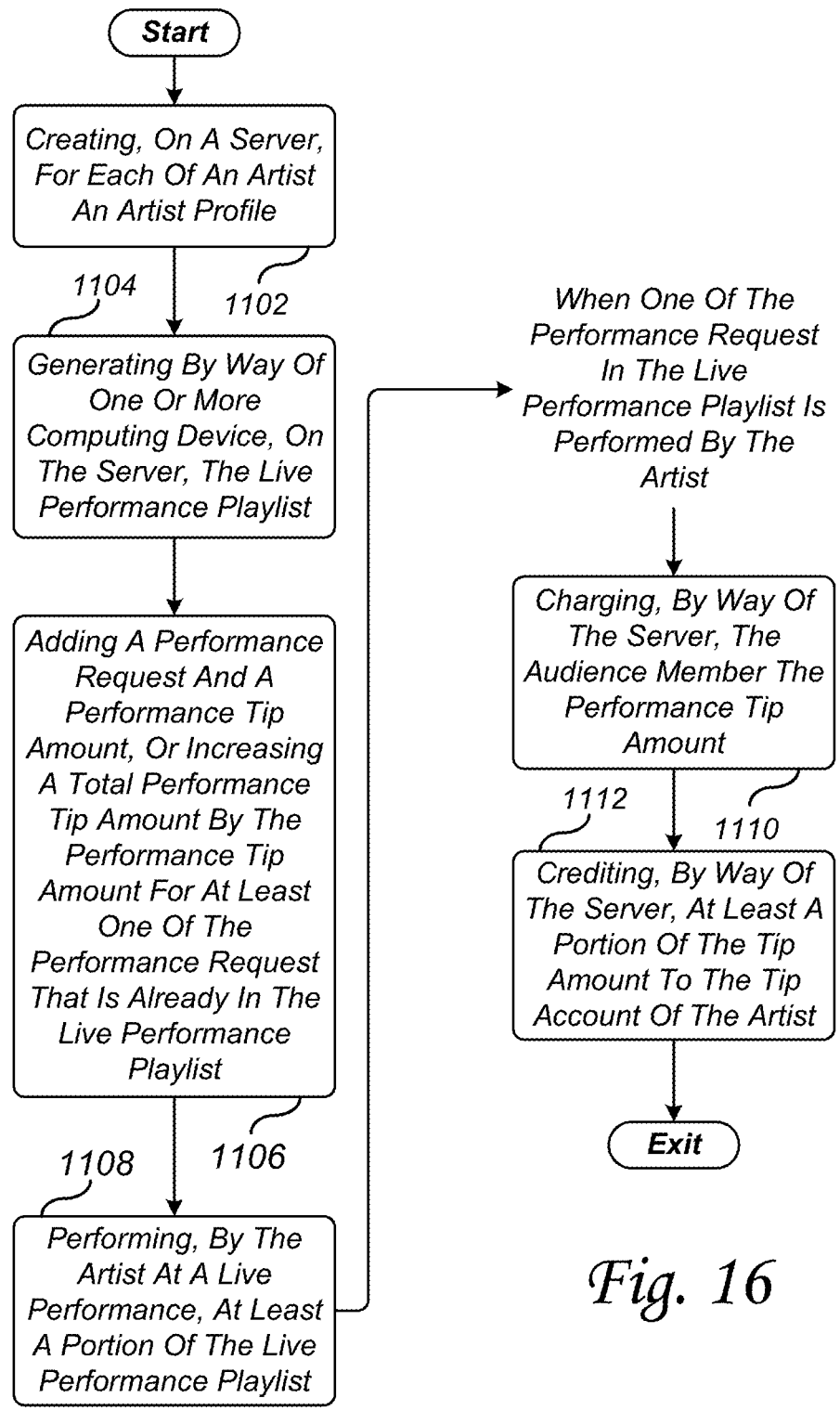

Referring to FIG. 16, there is illustrated one example of an artist live performance booking management platform 200 methods for increasing artist revenue from live performances. In an exemplary embodiment, artist 302 can create and manage a live performance playlist 508 that includes a tip amount 519 for at least some of the performance request 517 entries on the live performance playlist 508. In this regard, audience member 304 can add or increase a tip amount 519 for one or more of the performance requests 517 entries on the live performance playlist 508 as an incentive for artist 302 to perform their favorite playlist performance request 517 entry. As a result of the tips, artist 302 revenue from the live performance can be increased. The method begins in step 1102.

In step 1102, on server 202, for each of an artist 302 an artist profile 502 is created. The artist profile 502 comprises a live performance playlist 508 and a tip account 512. In operation, one or more computing devices 232 can be in data communication with server 202. The method then moves to step 1104.

In step 1104, by way of one or more of the computing devices 232, on server 202, the live performance playlist 508 of what the artist 302 will perform during a live performance 402 at venue 404 can be generated. The live performance playlist 508 is accessible to one or more audience members 304 at least during the live performance 402 using one or more computing devices 232. The method then moves to step 1106.

In step 1106, a performance request 517 and a performance tip amount 521 (as better illustrated in at least FIGS. 10 and 11) can be added, or a total performance tip amount 519 can be increased by the performance tip amount 521 for at least one of the performance requests 517 that is already in the live performance playlist 508 by one or more of the audience members 304 using one or more of the computing devices 232. The method then moves to step 1108.

In step 1108, the live performance playlist 508 can be performed by artist 302 at a live performance 402. The method then moves to step 1110.

In step 1110, when one of the performance requests 517 in the live performance playlist 508 is performed by artist 302, by way of server 202, the audience member 304 is charged or otherwise pays the performance tip amount 521 or the sum of all the performance tip amounts 521 applied to the performance request 517. And, in step 1012, by way of server 202, at least a portion of the tip amount 521 is credited to the tip account 512 of artist 302.

In operation, revenue for artist 302, from the live performance 402, is increased by at least a portion of the tip amount 521 for executing the performance request 517 of the audience member 304 at the live performance 402.

In an alternative exemplary embodiment, artist 302 can elect to keep all the tip amount funds 521 in effect keeping all of the total tip amounts 519 for each of the performance requests 517 on the live performance playlist 508 whether artist 302 performed the performance request 517 or not.

In another alternative exemplary embodiment, artist 302 can elect to give back or cancel the tip amount funds 521 in effect nullifying or otherwise canceling the total tip amount 519 for each of the performance requests 517 on the live performance playlist 508 that artist 302 didn't perform.

In an exemplary embodiment, the manner in which an audience member can be charged for a tip amount 521 can include preauthorizing a maximum amount and then accruing a total amount until the end of the live performance 402.

Then charging the total amount one time, charging or decrement on a tip amount by tip amount basis each time a tip amount 521 is made, or other methods as may be required and/or desired in a particular embodiment.

In an exemplary embodiment, a portion of the tips can be retained by the artist live performance booking management platform 200, or retained by other accounts or systems as a service fee for transacting the debit and credit of the tips. Such service fees can be a fixed fee, a percentage, a combination thereof, or other types of kinds of fees.

Figure 17:
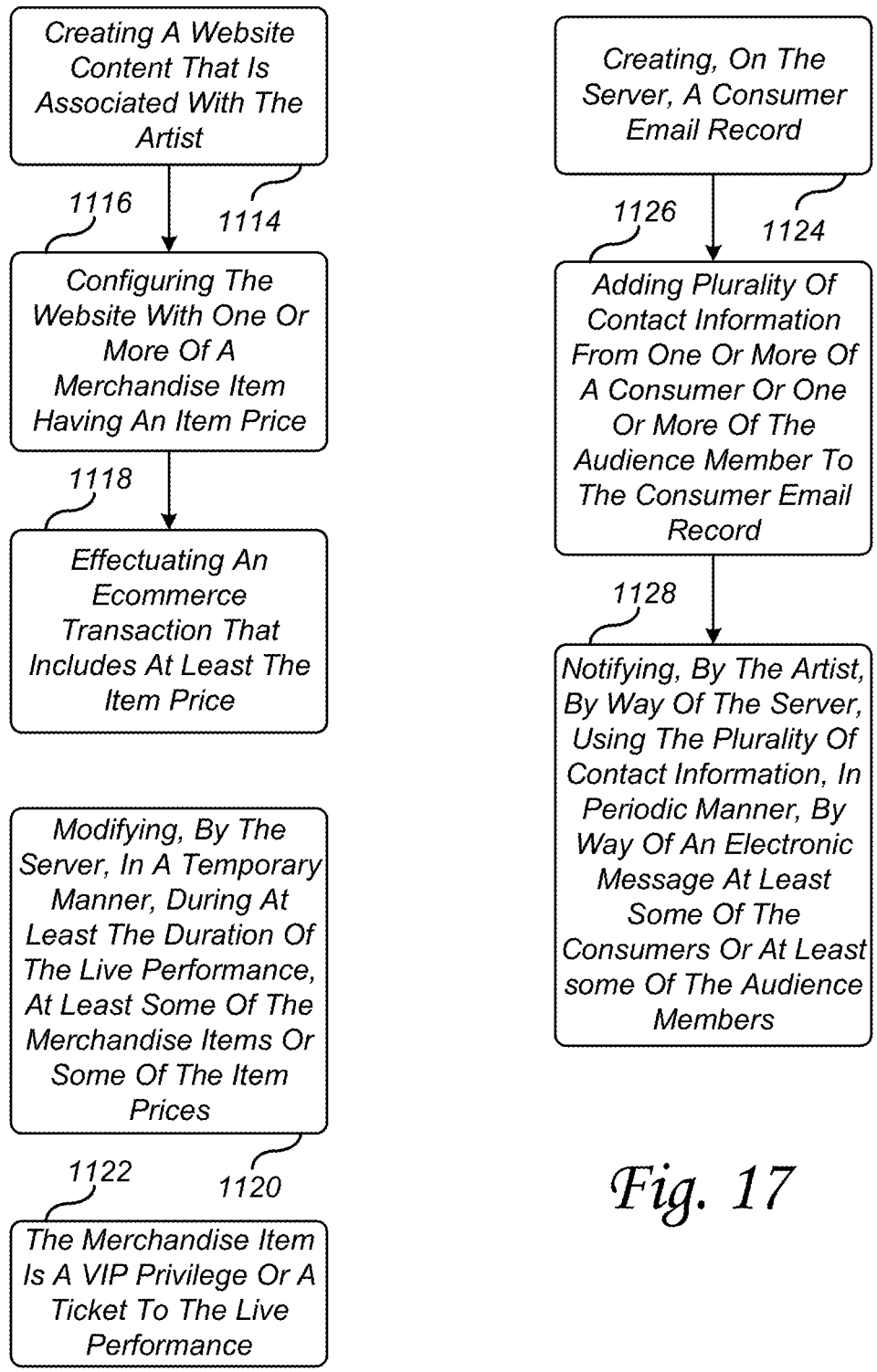
FIGS. 17-19 illustrate exemplary embodiments that can be used interchangeably with the methods of the present invention.
Figure 18:
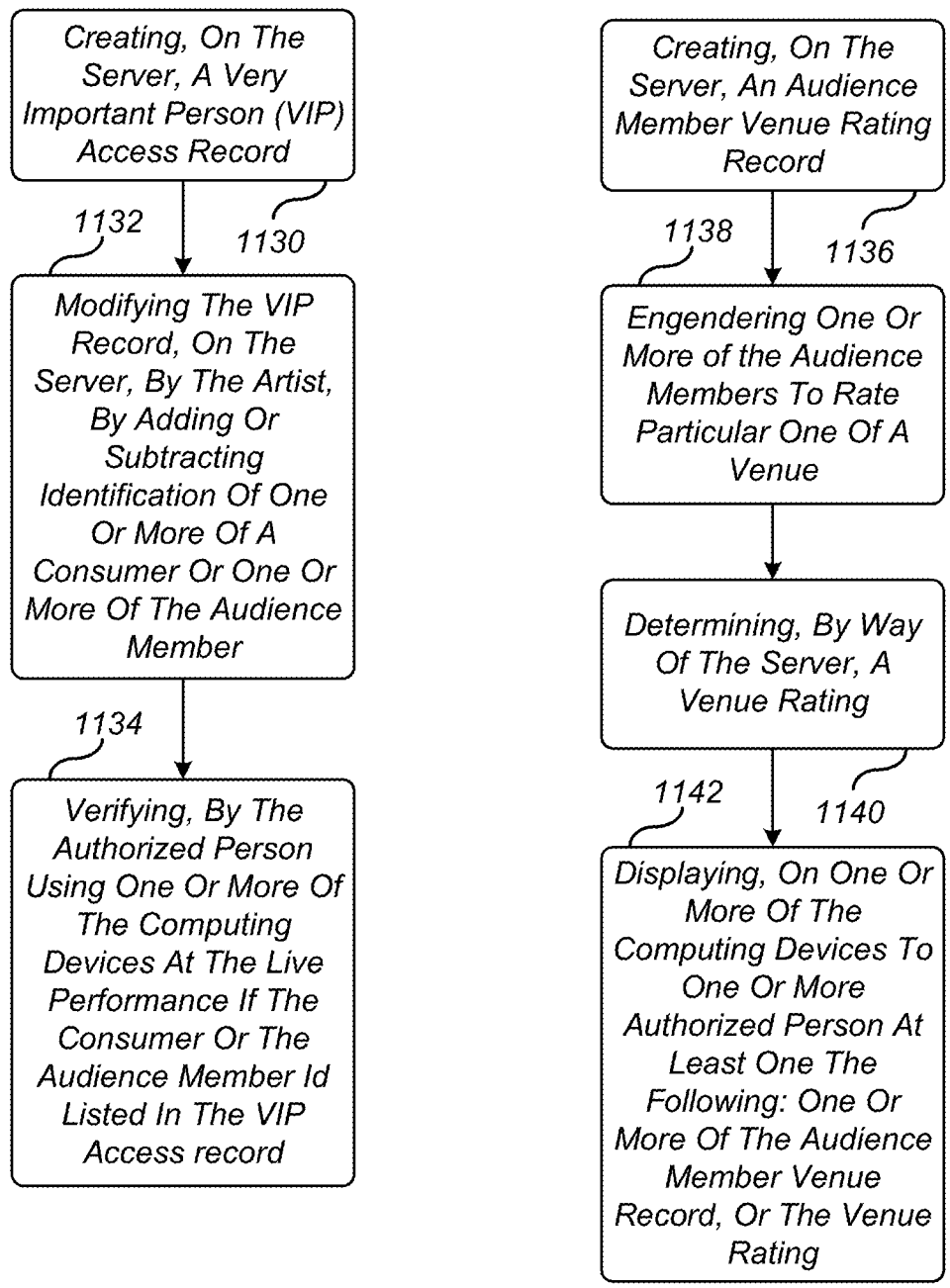

Referring to FIGS. 17-19, there are illustrated exemplary embodiments that can be used interchangeably with the methods of the present invention.

With reference to FIG. 17, in step 1114, website content 522 can be created that is associated with artist 302. The artist profile 502 can comprise the web site content 522 and a website revenue account 530. In operation, artist 302 can create a website that serves as a landing page for consumers 306 and audience members 304. Such a website can be used as a blog, or an online store, enable subscription to the consumer email record 526 also referred to as the email list, and be used for other purposes, as may be required and/or desired in a particular embodiment. The method then moves to step 1116.

In step 1116, the website content 522 can be configured with one or more merchandise items each having an item price that is for sale. The method then moves to step 1118.

In step 1118, an e-commerce transaction can be effectuated that includes at least the item price with a customer 306 or the audience member 304 who is buying one or more of the merchandise items.

In step 1120, at least some of the merchandise items or some of the item prices can be modified, by the server, in a temporary manner, during at least the duration of the live performance.

In step 1122, the merchandise items can be a very important person (VIP) privilege or a ticket to the live performance. In an exemplary embodiment, a VIP privilege can be a backstage pass, free admission to the live performance, an artist 302 autographed item, or other types and/or kinds of VIP privileges as may be required and/or desired in a particular embodiment.

In step 1124, a consumer email record 526 can be created, on server 202. The artist profile 502 can comprise the consumer email record 526. In an exemplary embodiment, the consumer email record 526 can be an email list that fans 304/306 and/or venue managers 308 can subscribe to receive periodic information about and or from artist 302. Such periodic information can be upcoming live performance event notifications, blog posts, new audio or video releases, or other types and/or kinds of periodic information. The method then moves to step 1126.

In step 1126, a plurality of contact information can be added from one or more consumers 306, one or more audience members 304, or one or more venue 404 by way of venue manager 308 to the consumer email record 526. The method then moves to step 1128.

In step 1128, by way of an electronic message at least some of the consumers 306, at least some of the audience members 304 (fans 304/306), or at least some of the venues 404 (communicating with the venue managers 308) are notified by way of the server 202 using the plurality of contact information in a periodic manner.

In an exemplary embodiment, a portion of the e-commerce can be retained by the artist live performance booking management platform 200, or retained by other accounts or systems as a service fee for transacting the debit and credit of the e-commerce transactions. Such service fees can be a fixed fee, a percentage, a combination thereof, or other types of kinds of fees.

Referring to FIG. 18, in step a very important person (VIP) access record 532 can be created on server 200. The artist profile 502 can comprise the VIP access record 532. The VIP access record 532 can be accessible to one or more authorized persons 310. Such authorized persons 310 can be tasked with validating the VIPs and handing out the VIP privileges such as VIP tickets, backstage passes, and other predefined VIP privileges. Additionally, the authorized persons 310 can be live performance front door managers, backstage managers, event personnel, or other authorized persons 310 as may be required and/or desired in a particular embodiment. The method then moves to step 1132.

In step 1132, the VIP access record 532, on server 202, can be modified by artist 302 by adding or subtracting the identification of one or more consumer 306 or one or more audience member 304 (fans 304/306) using one or more of the computing devices 232. The method then moves to step 1134.

In step 1134, if the consumer or the audience member is listed in the VIP access record is verified by the authorized person 310 at the live performance 402 using one or more of the computing devices 232, and granting if listed on the VIP access record 532 the consumer 306 or the audience member 304 (fans 304/306) one or more predefined privilege.

In step 1136, a venue rating record 572 can be created on server 202. In an exemplary embodiment, the venue rating record 572 captures posts, survey results, and other feedback from fans 304/306, artists 302, and selectively others as it related to the venue 308. Such information, results, and feedback can include how well venue 404 is equipped for the live performance, venue 404 amenities, cleanliness, friendliness, food and drink menu critiques, and other venue-related information. The method then moves to step 1138.

In step 1138, one or more artists 302 or one or more audience members 304 can be engendered to rate a particular venue 404 by posting to the venue rating record 572 a venue message or a venue survey response using one or more of the computing devices 232. The method then moves to step 1140.

In step 1140, a venue rating by way of the results of the venue messages and/or the venue survey responses can be determined by server 202. The method then moves to step 1142.

In step 1142, one or more of the venue rating records 572, or the venue rating can be displayed on one or more of the computing devices 232 to one or more authorized persons. In this regard, the venue rating records 572 and the venue rating can be filtered appropriately for different authorized persons. Authorized persons can include artists 302, fans 304/306, venue 404, event personnel 310, or other types and/or kinds of authorized persons, as may be required and/or desired in a particular embodiment.

Referring to FIG. 19, in step 1144 an artist rating record 582 can be created on server 202. In an exemplary embodiment, the artist rating record 582 captures posts, survey results, and other feedback from fans 304/306, venues 308, and selectively others as it related to artist 302. Such information, results, and feedback can include how well artist 302 performed and sounded, their punctuality, the quality of the live performance, the live performance playlist 508, and other artist-related information. The method then moves to step 1146.

In step 1146, one or more venue 404 (authorized person such as the venue manager 308) or one or more audience member 304 can be engendered to rate a particular artist 302 by posting to the artist rating record 582 an artist message or an artist survey response using one or more of the computing devices 232. The method then moves to step 1148.

In step 1148, an artist rating by way of the results of the artist messages and/or the artist survey responses can be determined by server 202. The method then moves to step 1150.

In step 1150, one or more of the artist rating records 582, or the artist rating can be displayed on one or more of the computing devices 232 to one or more authorized persons. In this regard, the artist rating records 572, and the artist rating can be filtered appropriately for different authorized persons. Authorized persons can include artists 302, fans 304/306, venue 404, event personnel 310, or other types and/or kinds of authorized persons, as may be required and/or desired in a particular embodiment.

In step 1152, a promotional blog record 528 can be created. The artist profile 502 can comprise the promotional blog record 528. In an exemplary embodiment, the promotional blog record 528 can enable the artist or other authorized persons to author articles, blog content, publish video, audio, or other digital content that can be accessed by way of a website, social media, e-commerce, or accessed in other ways. The method then moves to step 1154.

In step 1154, the promotional blog record 528 can be configured with one or more of an artist 302 promotion. In this regard, artist 302 can determine a promotion, advertisement, event promotion, song or music promotion, news about the band, artist 302 or other, or other types and/or kinds of articles, messages, promotions, advertisements, or other collectively referred to as a promotional blog and stored in a promotional blog record 528 can be viewable on a website such as an artist 302 landing page website which can include website content 522.

In step 1156, a geofenced area 406 can be created, on server 202, which is located proximate to at least a portion of venue 404 associated with the live performance 402. As better illustrated in at least FIG. 8, geofencing 406 effectuates the ability to determine by way of the GPS 216 that is part of the fans 304/306 computing devices 232 such as smartphones and other types and/or kinds of computing devices 232 whether they are inside the venue 404 area or outside the venue 404 area. Once determined, for example, and not a limitation, appropriate electronic messaging including at-venue-only promotions and electronic communications can be sent to fans 304/306 that are inside the geofenced 406 boundary area of the venue 404.

In another exemplary embodiment, such geofenced boundaries 406 and determination that a fan 304/306 is present at the live performance 402 can also be used to restrict tips and other live performance activities with the software application of the present invention to those fans 304/306 that are in actual attendance of the live performance 402 at the venue 404. The method then moves to step 1158.

In step 1158, an electronic message can be communicated to one or more of the fans 304/306 including the audience member 304, or one or more consumers 306 based on the geographic location of the computing device 232 by way of the GPS 216 or other suitable geolocating method using the computing device 232 that associated with the audience member 304 or the consumer 306. The electronic message can be different based on whether the computing device 232 is inside or outside the geofenced area 406, only sent to the computing devices 232 that are inside the geofenced area 406, only sent to the computing devices 232 that are outside the geofenced area 406, or other types or kinds of electronic messages, as may be required and/or desired in a particular embodiment.

In step 1160, in an exemplary embodiment, the artist promotion can be an upcoming one or more of the live performances 402, availability of one or more of a ticket for one or more of the live performances 402, merchandise available in an online store, or other types or kinds of artist promotions.

In step 1162, in an exemplary embodiment, artist 302 can be a musician, an actor, a speaker, a presenter, or other types or kinds of artists.

In step 1164, in an exemplary embodiment, the live performance 402 can be one or more songs, a concert, a movie, a film, a play, a musical, a speech, a digital media, an audio media, a video media, a presentation, or other types or kinds of live performance.

In step 1166, in an exemplary embodiment, the live performance playlist 508 can comprise a song list, a movie list, a film list, a picture, an image, an audio media, digital media, and other media used in combination with the song list, the movie list, or the film list, or other types or kinds of items.

Figure 20:
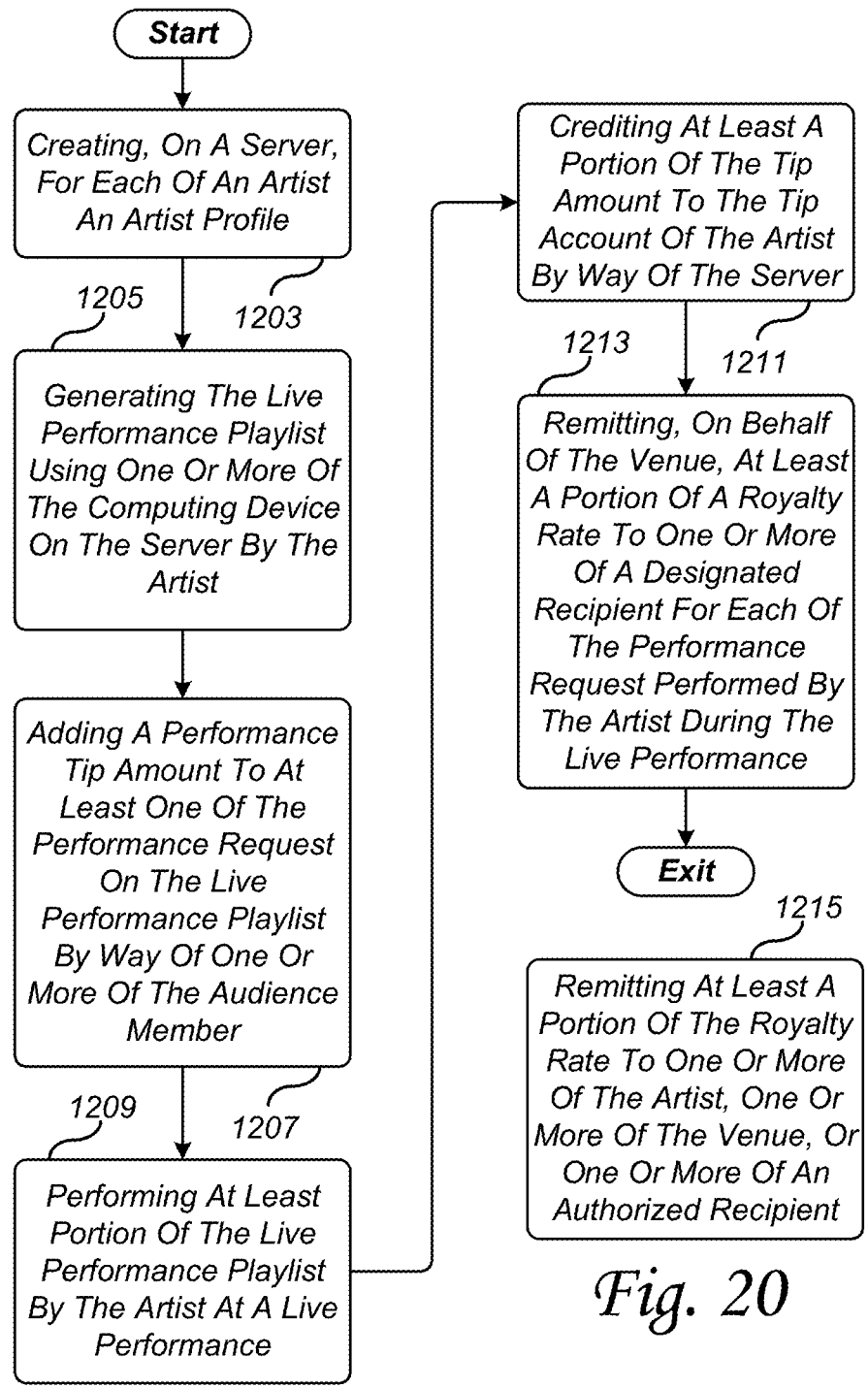
FIGS. 20-21 illustrate examples of an artist live performance booking management platform methods for increasing artist revenue from live performances.

Referring to FIG. 20, there is illustrated one example of an artist live performance booking management platform 200 and a method for increasing artist revenue from live performances. In an exemplary embodiment, in addition to artist 302 creating and managing a live performance playlist 508 that includes a tip amount 519 for at least some of the performance request 517 entries on the live performance playlist 508, royalties can be paid on behalf of the venue for each of the performance request 517 that the artist 302 performs during the live performance 402. In this regard, in lieu of paying a royalty fee based on the maximum occupancy of venue 404 or other similar methods, royalties can be paid by the artist live performance booking management platform 200 on behalf of venue 404 for only the performance requests 517 that artist 302 performed. An advantage, in the present invention, is that the royalties paid by venue 404 can be reduced and contained to the actual performance requests 517 of the live performance playlist 508 that artist 302 performed. The method begins in step 1203.

In step 1203, an artist profile 502 is created on server 202 for each artist 3-2. Artist profile 302 comprises a live performance playlist 508 and a tip account 512. One or more computing devices 232 is in data communication with server 202. The method then moves to step 1205.

In step 1205, the live performance playlist 508 is generated on server 202 by artist 302 using one or more computing devices 232. The live performance playlist 508 comprises one or more performance requests 517 the artist 302 may perform during a live performance 402 at a venue 404. The live performance playlist 508 is accessible to one or more audience members 304 at least during the live performance 402 using one or more computing devices 232. The method then moves to step 1207.

In step 1207 a performance tip amount 521 is added to at least one of the performance requests 517 on the live performance playlist 508 by way of one or more of the audience members 304 using one or more of the computing devices 232. The method then moves to step 1209.

In step 1209, at least a portion of the live performance playlist 508 is performed by artist 302 at a live performance 404. The method then moves to step 1211.

In step 1211, at least a portion of the performance tip amount 521 is credited to the tip account 512 of artist 302 by way of server 202 when one of the performance requests 517 on the live performance playlist 508 is performed by artist 302 during the live performance 402. The method then moves to step 1213.

In step 1213, on behalf of the venue, a portion of a royalty rate to one or more designated recipients is remitted for each of the performance requests 517 performed by artist 302 during the live performance 402 at venue 404. Such designated recipients can be performance rights organizations (PRO), BMI, ASCAP, or others, as may be required and/or desired in a particular embodiment.

In an exemplary embodiment, in step 1215, in addition to at least a portion of the royalty rate being remitted to the designated recipient, a portion of the royalty rate can be distribute to one ore more of the artist includes the performing artist, one or more venue including the venue in which the live performance is taking place, or other authorized recipients, as may be required and/or desire din a particular embodiment.

In operation, revenue for artist 302, from the live performance 402, is increased by at least a portion of the performance tip amount 521 for executing the performance requests 517 at the live performance 402.

In an alternative exemplary embodiment, artist 302 can elect to keep all the tip amount funds 521 in effect keeping all of the total tip amounts 519 for each of the performance requests 517 on the live performance playlist 508 whether artist 302 performed the performance request 517 or not.

In another alternative exemplary embodiment, artist 302 can elect to give back or cancel the tip amount funds 521 in effect nullifying or otherwise canceling the total tip amount 519 for each of the performance requests 517 on the live performance playlist 508 that artist 302 didn't perform.

In an exemplary embodiment, the manner in which an audience member can be charged for a tip amount 521 can include preauthorizing a maximum amount and then accruing a total amount until the end of the live performance 402. Then charging the total amount one time, charging or decrement on a tip amount by tip amount basis each time a tip amount 521 is made, or other methods as may be required and/or desired in a particular embodiment.

In an exemplary embodiment, a portion of the tips can be retained by the artist live performance booking management platform 200, or retained by other accounts or systems as a service fee for transacting the debit and credit of the tips. Such service fees can be a fixed fee, a percentage, a combination thereof, or other types of kinds of fees.

In an exemplary embodiment, a portion of the royalty can be retained by the artist live performance booking management platform 200, or retained by other accounts or systems as a service fee for transacting the debit and credit of the royalty rate. Such service fees can be a fixed fee, a percentage, a combination thereof, or other types of kinds of fees.

Figure 21:
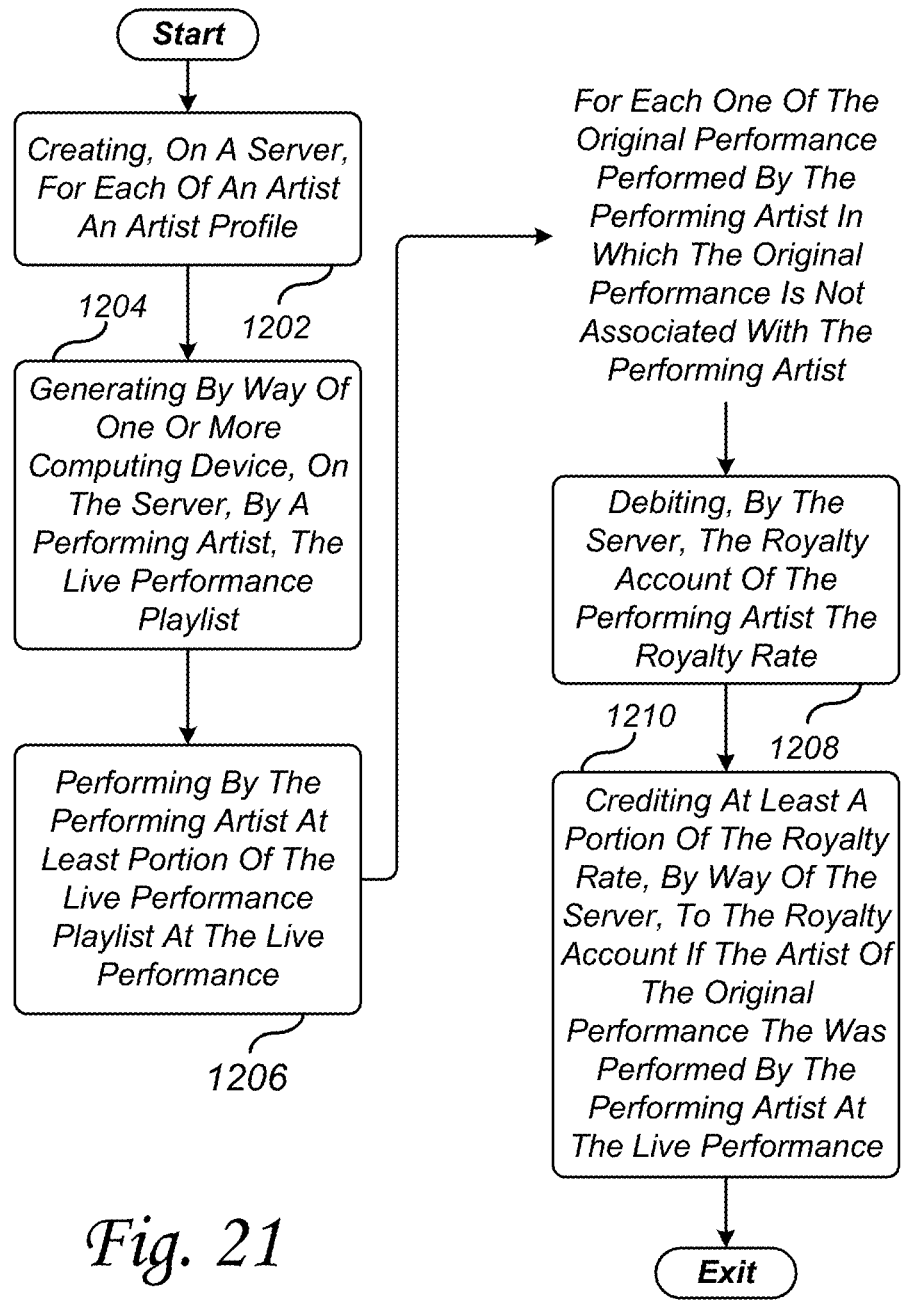

Referring to FIG. 21, there is illustrated one example of an artist live performance booking management platform 200 and a method for increasing artist revenue from live performances. In an exemplary embodiment, one way for artist 302 to increase the revenue from live performances is to collect a royalty when another artist 302 referred to as performing artist 302 performs one of the artist's original performances (such as a song) at a live performance. In this regard, performing artist 302 will pay artist 302 a royalty rate.

An advantage, in the present invention, is that prior there was no way to charge royalties on a song-by-song basis during live performances. Rather, the venue or appropriate authority would be charged a royalty rate based on the maximum occupancy size of the venue regardless of the actual content performed during live performances. The present invention allows, by way of the artist live performance booking management platform 200, a performing artist to pay a royalty to the artist of the original composition. Such payment can instead be effectuated from the venue 404 hosting the live performance 402 to the artist of the original composition. The method begins in step 1202.

In step 1202, for each artist 302 an artist profile 502 is created on server 202. The artist profile 502 comprises an original performance record 516, a live performance playlist 508, and a royalty account 520. The original performance record 516 comprises one or more original performances and a royalty rate associated with each of the original performances. In operation, one or more computing devices 232 is in data communication with server 202. The method then moves to step 1204.

In step 1204, the method continues by generating the live performance playlist 508 on server 202 by a performing artist 302 using one or more of the computing devices 232. The live performance playlist 508 comprises at least one of the original performances 516 that the performing artist 302 will perform at a live performance 402. At least one of the artists 302 is the performing artist 302. The method then moves to step 1206.

In step 1206, the performing artist 302 performs at least a portion of the live performance playlist 508 at the live performance 402. The method then moves to step 1208.

In step 1208, for each one of the original performances performed by the performing artist 302 in which the original performance is not associated with the performing artist 302 the method debits, by the server 202, the royalty account 520 of the performing artist 302 the royalty rate. And in step 1210 credits at least a portion of the royalty rate, by the server 202, to the royalty account 520 of the artist 302 of the original performance that was performed by the performing artist 302 at the live performance 402.

In operation, revenue for artist 302 from the live performance 402 can be increased by at least a portion of the royalty rate when the original performance is performed by the performing artist 302 at the live performance 402.

In an exemplary embodiment, a portion of the royalty can be retained by the artist live performance booking management platform 200, or retained by other accounts or systems as a service fee for transacting the debit and credit of the royalty rate. Such service fee can be a fixed fee, a percentage, a combination thereof, or other types of kinds of fees.

Figure 22:
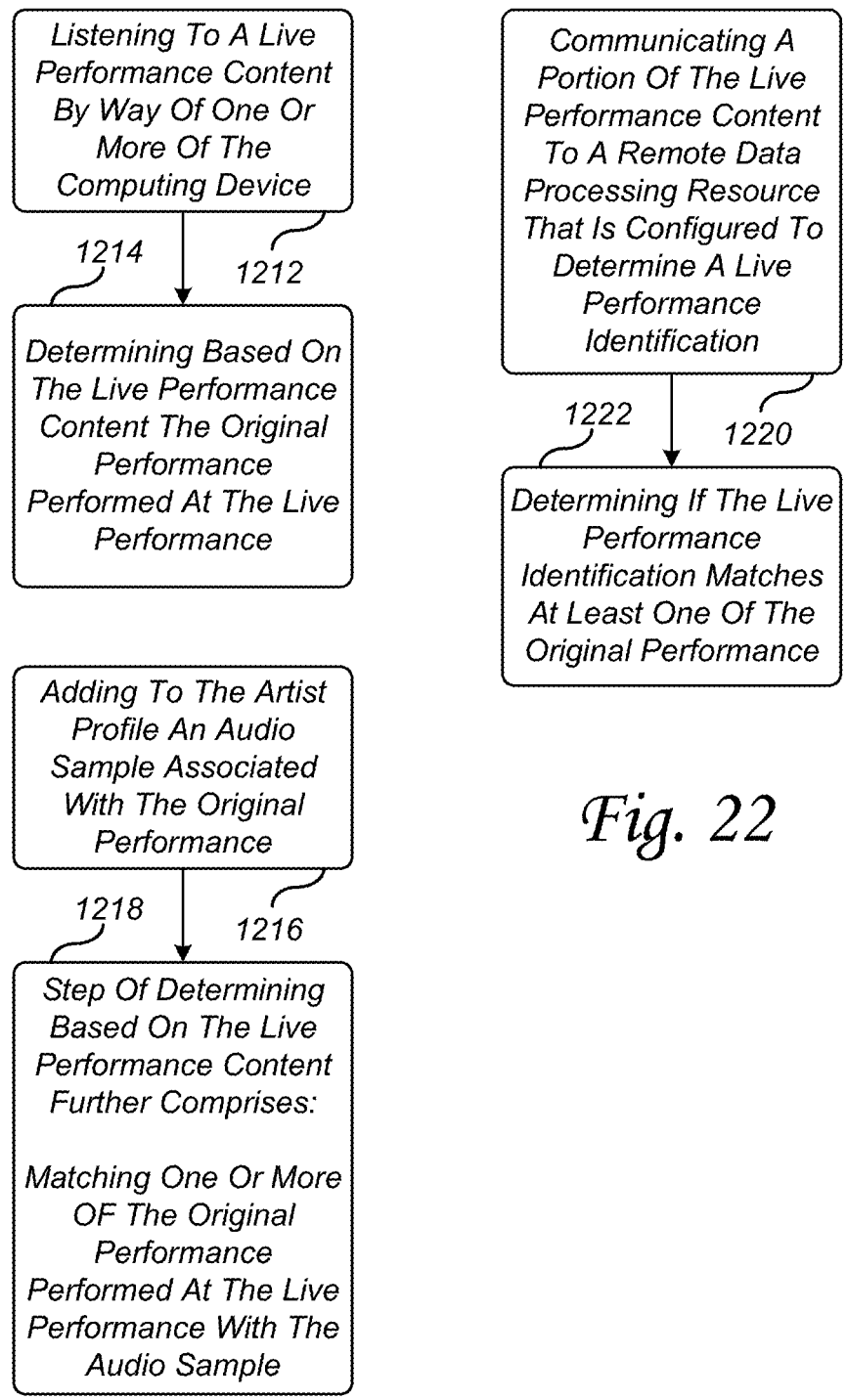
FIG. 22 illustrates exemplary embodiments that can be used interchangeably with the methods of the present invention.

Referring to FIG. 22, there are illustrated exemplary embodiments that can be used interchangeably with the methods of the present invention.

In step 1212, live performance content can be listened to by way of one or more of the computing devices 202 located at the live performance 402. In an exemplary embodiment, the microphone/camera 218 can be used to listen to the ongoing live performance 402. The method then moves to step 1214.

In step 1214, a determination can be made based on the live performance content, by one or more of the computing devices 232 or the server 202 of each of the original performances performed at the live performance 402. In this regard, the live performance content listened to by the computing device 232 microphone and/or camera 208 can be analyzed to determine which if any of the original performances was performed at the live performance.

In step 1216, an audio sample 518 associated with the original performance can be added to the artist profile 502. In an exemplary embodiment, the audio sample 518 of the original performance can enable digital matching of live performance audio with stored audio sample 518 to determine which of the original performance were performed by the performing artist 302 at the live performance 402. The method then moves to step 1218.

In step 1218, step 1214 of determining based on the live performance content further comprises matching one or more of the original performances performed at the live performance 402 by comparing the live performance content with the audio sample.

In step 1220, a portion of the live performance content is communicated to a remote data processing resource 202 that is configured to determine a live performance identification. The method then moves to step 1222.

In step 1222, a determination is made if the live performance identification matches at least one of the original performances. In an exemplary embodiment, the data processing resource 202 can be a system that can match the live performance content to a library of original performances and determine which of the original performance were performed by the performing artist. When a match is found a live performance identification can be returned and used to effectuate the royalty transactions, and other transactions and/or method steps of the present invention.

Figure 23:
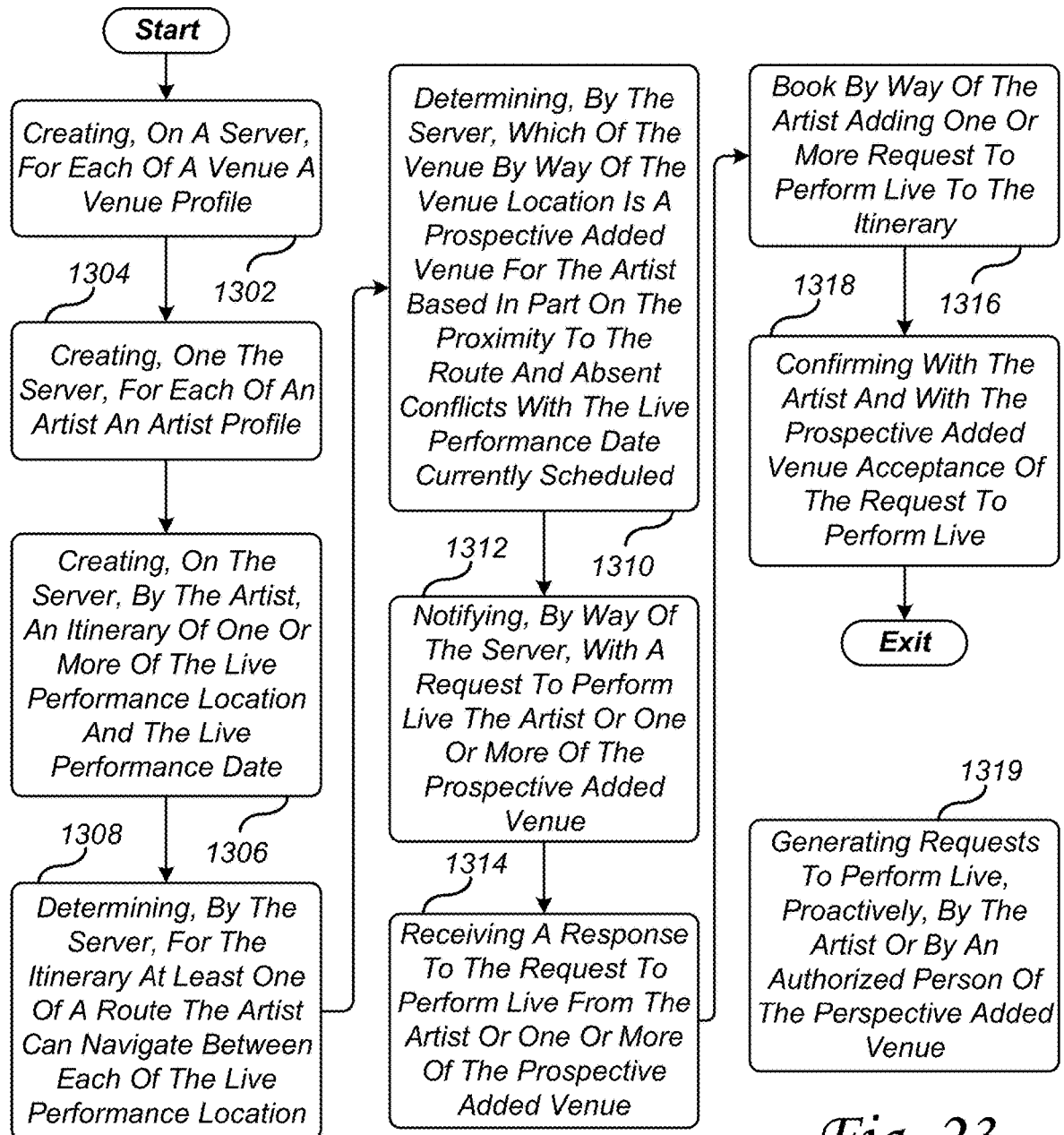
FIG. 23 illustrates one example of an artist live performance booking management platform method for increasing artist revenue from live performances.

Referring to FIG. 23 and with reference to at least FIG. 6, there is illustrated one example of an artist live performance booking management platform 200 methods for increasing artist revenue from live performances 402. In an exemplary embodiment, finding additional venues 608A/608B in which to perform a live performance 402 along an itinerary route 610 between already scheduled live performance locations 604/606 and live performance dates 510 is one way to increase artist 302 revenue from live performances 402. The method begins in step 1302.

In step 1302, for each of a venue 404 a venue profile 550 can be created on the server 202. The venue profile 550 comprises at least one venue location 552. One or more computing devices 232 can be in data communication with server 202. The method then moves to step 1304.

In step 1304, for each of an artist 302 an artist profile 502 can be created on the server 202. The artist profile can comprise one or more live performance locations 506 and associated therewith a live performance date 510. The method then moves to step 1306.

In step 1306, an itinerary 504 can be created on server 202 by artist 302 using one or more computing devices 232. The itinerary 504 can comprise one or more live performance locations 506 and the live performance date 510. The method then moves to step 1308.

In step 1308, a determination is made, by server 202, for itinerary 504 at least one route 610 that artist 302 can navigate between 604/604 each of the live performance location 506. The method then moves to step 1310.

In step 1310, a determination is made, by server 202, as to which of venue 404 by way of the venue location can be a prospective added venue 608A/608B for the artist 302 based in part on the proximity to route 610 and absent conflicts with the live performance dates 510 currently scheduled.

In an exemplary embodiment, other factors can also be used in determining which of the venues can be considered a prospective added venue 608A/608B. For example and not a limitation, the maximum audience size, the type of location including the type of clientele such as rock, country, jazz, or other types as an example, and other factors can be considered as may be required and/or desired in a particular embodiment. The method then moves to step 1312.

In step 1312, by way of the server 202 a notification is sent with a request to perform live that is received on one or more computing devices 232 by the artist 302 or one or more of the prospective added venues 608A/608B. The request to perform live can comprise at least the venue location and optionally at least one proposed live performance date. The method then moves to step 1314.

In step 1314, a response to the request to perform live is received from the artist 302 or one or more of the prospective added venue 608A/608B using one or more of the computing devices 232. The method then moves to step 1316.

In step 1316, one or more of the prospective added venues 608A/608B is booked for a live performance and live performance date by adding one or more requests to perform live to itinerary 504 on server 202 by way of the artist 302 using one or more of the computing devices 232. The method then moves to step 1318.

In step 1318, the request to perform live acceptance and subsequent scheduling is confirmed, by artist 302, with the prospective added venue 608A/608B.

In an exemplary embodiment, in step 1319, the artist or authorized person of the prospective added venue can proactively generate the request to perform live. In this regard, in addition to the server 202 matching artists and prospective added venues along an itinerary, the artists and the venues (by way of an authorized person of the venue such as the venue manager 308) can proactively identify opportunities for a live performance and generate the request to perform live which is then communicated to the appropriate party (artist or venue). This allows the artist and/or the venue to search the artist live performance booking platform 200 for live performance opportunities for which a live performance can be booked.

In operation, revenue for artist 302 from the live performance is increased from booking an additional live performance along route 610 between one or more of the live performance locations 604/606.

In an exemplary embodiment, a portion of the booking fee can be retained by the artist live performance booking management platform 200, or retained by other accounts or systems as a service fee for transacting the debit and credit of the booking fee. Such service fees can be a fixed fee, a percentage, a combination thereof, or other types of kinds of fees.

Figure 24:
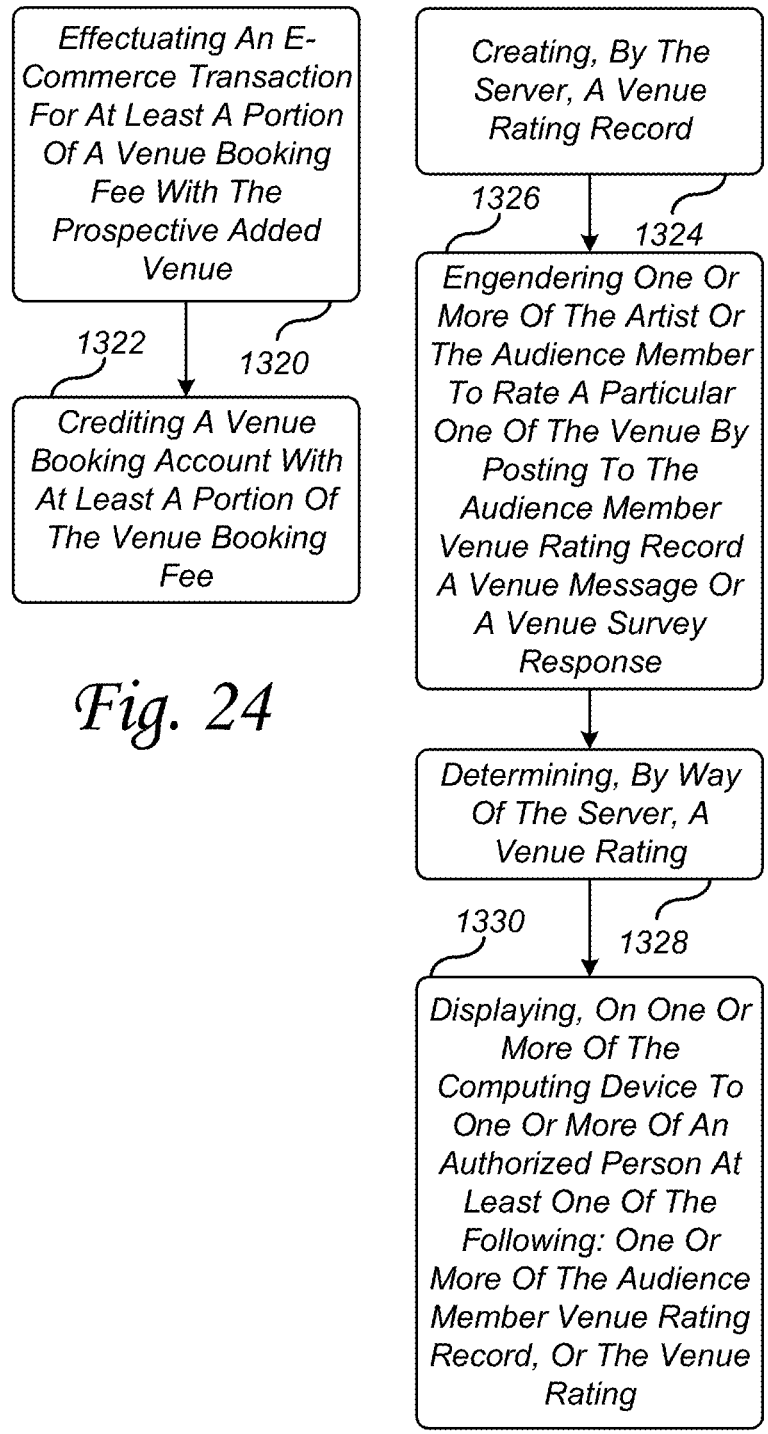
FIG. 24 illustrates exemplary embodiments that can be used interchangeably with the methods of the present invention.

Referring to FIG. 24, there are illustrated exemplary embodiments that can be used interchangeably with the methods of the present invention.

In step 1320, an e-commerce transaction is effectuated for at least a portion of a venue booking fee amount with the prospective added venue 608A.608B. The method then moves to step 1322.

In step 1322, a booking fee account 514 with at least a portion of the venue booking fee. Artist profile 502 can comprise the booking fee account.

In step 1324, a venue rating record 572 is created on server 202. The method then moves to step 1326.

In step 1326, one or more artists 302 or one or more of the audience members 304 are engendered to rate a particular one of a venue 404 by posting to the venue rating record 572 a venue message or a venue survey response using one or more of the computing devices 232. The method then moves to step 1328.

In step 1328, a determination is made, by server 202, of a venue rating by way of the results of the venue message or the venue survey response. The method then moves to step 1330.

In step 1330, one or more venue rating records, the venue rating, or other information is displayed on one or more computing devices 232 to one or more authorized persons.

In step 1332, an artist rating record 582 is created on server 202. The method then moves to step 1334.

The capabilities of the present invention can be implemented in software, firmware, hardware, or some combination thereof.

As one example, one or more aspects of the present invention can be included in an article of manufacture (e.g., one or more computer program products) having, for instance, computer-usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An artist live performance booking management platform method for increasing artist revenue from live performances, the method comprising the steps of:
   creating an artist profile on a server for each of an artist, the artist profile comprises a live performance playlist and a tip account, wherein one or more computing devices is in data communication with the server;
   generating the live performance playlist on the server by the artist using the one or more computing devices, the live performance playlist comprises one or more performance requests the artist may perform during a live performance at a venue, the live performance playlist is accessible to one or more audience members at least during the live performance using at least one of the one or more computing devices;
   adding a performance tip amount to at least one of the one or more performance requests on the live performance playlist by way of at least one of the one or more audience members, using at least one of the one or more computing devices;
   charging the at least one of the one or more audience members the performance tip amount by way of the server;
   performing at least a portion of the live performance playlist by the artist at a live performance; and
   crediting at least a portion of the performance tip amount to the tip account of the artist, by way of the server, when one of the one or more performance requests on the live performance playlist is performed by the artist during the live performance;
   wherein revenue for the artist, from the live performance, is increased by at least a portion of the performance tip amount for each of the one or more performance requests executed at the live performance.

2. The method in accordance with claim 1, further comprising the steps of:
   creating a website content that is associated with the artist, the artist profile comprises the website content and a website revenue account;
   configuring the website content with one or more merchandise items each having an item price that is for sale; and
   effectuating an e-commerce transaction that includes at least the item price with a customer or at least one of the one or more audience members who is buying at least one of the one or more merchandise items; and
   crediting the website revenue account with at least a portion of the item price.

3. The method in accordance with claim 2, further comprising the step of:
   modifying availability or price of at least some of the one or more merchandise items or some of the item price by the server, in a temporary manner, during at least the duration of the live performance.

4. The method in accordance with claim 2, wherein at least one of the one or more merchandise items is a very important person (VIP) privilege or a ticket to the live performance.

5. The method in accordance with claim 1, further comprising the steps of:
   creating a consumer email record on the server, the artist profile comprises the consumer email record;
   adding a plurality of contact information from one or more consumers, one or more audience members, or one or more venue to the consumer email record; and
   notifying, by way of an electronic message, at least some of the one or more consumers, at least some of the one or more audience members, or at least one authorized person of the venue, by way of the server, using the plurality of contact information from the consumer email record.

6. The method in accordance with claim 1, further comprising the steps of:
   creating a very important person (VIP) access record on the server, the artist profile comprises the VIP access record, the VIP access record is accessible to the artist or one or more authorized persons;
   modifying the VIP access record by adding or subtracting identification of one or more of the one or more consumers or one or more of the one or more audience members by using at least one of the one or more computing devices; and
   verifying if a specific one of the one or more consumers or a specific one of the one or more audience members is listed in the VIP access record, and granting to the specific one of the one or more consumers or to the specific one of the one or more audience members, if listed in the VIP access record, one or more predefined privileges by the artist or the one or more authorized persons using at least one of the one or more computing devices.

7. The method in accordance with claim 1, further comprising the steps of:
   creating a venue rating record on the server;
   engendering one or more of the artist or one or more audience members to rate a particular one of the venue by posting to the venue rating record a venue message or a venue survey response using at least one of the one or more computing devices;

determining, by way of the server, one or more venue ratings by way of results of the venue message or the venue survey response; and displaying, on one or more computing devices to one or more authorized persons, at least one of the following: data from the venue rating record, or data associated with the one or more of the venue ratings.

8. The method in accordance with claim 1, further comprising the steps of:

creating an artist rating record on the server;

engendering one or more authorized persons of the venue or one or more audience members to rate a particular one of the artist by posting to the artist rating record an artist message or an artist survey response using at least one of the one or more computing devices;

determining, by way of the server, one or more artist ratings by way of the results of the artist message or the artist survey response; and displaying, on one or more computing devices to one or more authorized persons at least one of the following: one or more of the artist rating record, or data associated with the one or more of the artist ratings.

9. The method in accordance with claim 1, further comprising the steps of:

creating a promotional blog record, the artist profile comprises the promotional blog record; and configuring the promotional blog record with one or more artist promotions.

10. The method in accordance with claim 9, wherein the one or more artist promotions is at least one of the following: upcoming one or more live performance, availability of one or more tickets for one or more future live performances, or merchandise available in an online store.

11. The method in accordance with claim 1, further comprising the steps of:

creating a geofenced area that is located proximate to at least a portion of the venue associated with the live performance; and communicating an electronic message to one or more of the one or more audience members or one or more of the one or more consumers based on geographic location of a specific one or more or the one or more computing devices associated with a specific one or more of the one or more audience members or a specific one or more of the consumers, the electronic message is one of the following: different based on whether the specific one of the one more computing devices is inside or outside the geofenced area, only sent to one or more of the one or more computing devices that are inside the geofenced area, or only sent to one or more of the one or more computing devices that are outside the geofenced area.

12. The method in accordance with claim 1, wherein the artist is at least one of the following: a musician, an actor, a speaker, or a presenter;

wherein the live performance is at least one of the following: a song, a concert, a movie, a film, a play, a musical, a speech, a digital media, an audio media, a video media, or a presentation; and wherein the live performance playlist comprises at least one of the following: a song list, a movie list, a film list, a picture, an image, an audio media, a digital media, or other media used in combination with the song list, the movie list, or the film list.

13. The method of claim 1, further comprising the step of:

remitting, on behalf of the venue, at least a portion of a royalty rate to one or more designated recipients for each of the one or more performance requests performed by the artist during the live performance.

14. The method in accordance with claim 13, further comprising the step of:

remitting a portion of the royalty rate to one or more of the artist, one or more of the venue, or one or more authorized recipients.

15. The method in accordance with claim 13, further comprising the steps of:

listening to live performance content by way of one or more of the one or more computing devices located at the live performance; and determining, based on the live performance content, each of the one or more performance requests performed by the artist during the live performance.

16. The method in accordance with claim 15, further comprising the steps of:

communicating a portion of the live performance content to a remote data processing resource that is configured to determine a live performance identification; and determining if the live performance identification matches at least one of the one or more performance requests performed by the artist.

17. The method in accordance with claim 13, wherein the original performance is at least one of the following: a song, a concert, a movie, a film, a play, a musical, a speech, a digital media, an audio, a video, or a presentation;

wherein the artist is at least one of the following: a musician, an actor, a speaker, or a presenter; and wherein the live performance playlist comprises at least one of the following: a song list, a movie list, a film list, a picture, image, audio, digital media, or other media used in combination with the song list, the movie list, or the film list.

18. The method of claim 1, further comprising the step of:

creating a venue profile on the server for each of the venue, the venue profile comprises at least one of a venue location;

creating an itinerary on the server by the artist of one or more live performance locations and the live performance dates using one or more computing devices;

determining, by the server, for the itinerary at least one route the artist can navigate between each of the one or more live performance locations;

determining, by the server, which of the venue, by way of the venue location, is a prospective added venue for the artist based in part on the proximity to the route and absence of conflicts with the live performance dates currently scheduled;

notifying, by way of the server, with a request to perform live that is received by the artist or one or more of the prospective added venue on one or more computing devices, wherein the request to perform live comprises at least the venue location and optionally at least one of a proposed live performance dates;

receiving a response to the request to perform live from the artist or one or more of the prospective added venues by using one or more computing devices;

booking by adding one or more of the request to perform live to the itinerary, on the server, using one or more computing devices; and confirming with the artist and the prospective added venue acceptance of the request to perform live.

19. The method in accordance with claim 18, further comprising the step of:

generating the request to perform live, proactively, by the artist or authorized person of the prospective added venue.

20. The method in accordance with claim 18, further comprising the steps of
effectuating an e-commerce transaction for at least a portion of a venue booking fee amount with the prospective added venue; and
crediting a booking fee account with at least portion of the venue booking fee, the artist profile comprises the booking fee account.

21. The method in accordance with claim 18, further comprising the steps of:
creating a venue rating record on the server;
engendering one or more of the artist or one or more audience members to rate a particular one of the venue by posting to the venue rating record a venue message or a venue survey response, using one or more computing devices;
determining, by the server, a venue rating by way of the results of the venue message or the venue survey response; and
displaying, on one or more computing devices to one or more authorized persons at least one of the following: one or more of the venue rating record, or data associated with the one or more of the venue rating.

22. The method in accordance with claim 18, further comprising the steps of:
creating an artist rating record on the server;
engendering one or more authorized persons of the venue or one or more audience members to rate a particular one of the artist by posting to the artist rating record an artist message or an artist survey response, using one or more computing devices;
determining, by the server, an artist rating by way of the results of the artist message or the artist survey response; and
displaying, on one or more computing devices to one or more authorized persons at least one of the following: one or more of the artist rating record, or data associated with the one or more of the artist rating.

* * * * *